US010346866B2

(12) United States Patent
Bous

(10) Patent No.: US 10,346,866 B2
(45) Date of Patent: *Jul. 9, 2019

(54) SYSTEM AND METHOD FOR CONDUCTING SEMI-OPAQUE SALES WITH ITEM BUNDLES

(71) Applicant: Joseph Bous, Washington, DC (US)

(72) Inventor: Joseph Bous, Washington, DC (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/309,621

(22) Filed: Jun. 19, 2014

(65) Prior Publication Data

US 2014/0304060 A1 Oct. 9, 2014

Related U.S. Application Data

(63) Continuation-in-part of application No. 14/259,482, filed on Apr. 23, 2014, which is a continuation of application No. 13/908,444, filed on Jun. 3, 2013, now Pat. No. 8,719,084, which is a continuation of application No. 13/158,026, filed on Jun. 10, 2011, now Pat. No. 8,458,021, which is a continuation-in-part of application No. 12/496,286, filed on Jul. 1, 2009, now Pat. No. 8,224,694, which is a continuation-in-part of application No. 11/776,019, filed on Jul. 11, 2007, now Pat. No. 8,185,434.

(51) Int. Cl.
*G06Q 30/00* (2012.01)
*G06Q 30/02* (2012.01)
*G06Q 30/06* (2012.01)

(52) U.S. Cl.
CPC ..... *G06Q 30/0207* (2013.01); *G06Q 30/0235* (2013.01); *G06Q 30/0239* (2013.01); *G06Q 30/0601* (2013.01); *G06Q 30/0631* (2013.01)

(58) Field of Classification Search
CPC .................................................. G06Q 30/0207
USPC .......................................................... 705/14
See application file for complete search history.

(56) References Cited

U.S. PATENT DOCUMENTS

| | | | |
|---|---|---|---|
| 5,897,620 A | 4/1999 | Walker et al. | |
| 6,134,534 A | 10/2000 | Walker et al. | |
| 6,418,415 B1 | 7/2002 | Walker et al. | |
| 6,990,457 B1 | 1/2006 | Litman et al. | |
| 7,430,531 B1 * | 9/2008 | Snyder | 705/35 |

(Continued)

FOREIGN PATENT DOCUMENTS

WO WO 01/37164 5/2001

*Primary Examiner* — Matthew L Hamilton

(57) ABSTRACT

Disclosed are systems, methods, and non-transitory computer-readable storage media for semi-opaque sales with bundles of items. An example bundle can include hotel lodging and a bonus service, status, or item associated with that hotel. An system can identify a first bundle of a first base and bonus item, and a second bundle of a second base and bonus item. The system can present a semi-opaque offer comprising the first bundle, the second bundle, and a discount price, wherein the semi-opaque offer does not identify which of the first bundle and the second bundle will be sold at the discount price to the user upon acceptance of the semi-opaque offer, and wherein the discount price is a full price of the first base item. After receiving acceptance of the semi-opaque offer from the user, the system can disclose that the user has purchased the first bundle at the discount price.

19 Claims, 15 Drawing Sheets

(56) References Cited

U.S. PATENT DOCUMENTS

| | | |
|---|---|---|
| 7,668,747 B2 | 2/2010 | Murphy et al. |
| 7,711,604 B1 * | 5/2010 | Walker et al. ............... 705/26.5 |
| 7,739,204 B1 * | 6/2010 | Cranner et al. ............... 705/400 |
| 7,769,612 B1 * | 8/2010 | Walker et al. ............... 705/7.11 |
| 7,818,209 B1 | 10/2010 | Lu et al. |
| 7,899,710 B1 * | 3/2011 | Walker et al. ............... 705/26.7 |
| 8,078,503 B1 | 12/2011 | Mussman et al. |
| 8,290,824 B1 * | 10/2012 | Mesaros ...................... 705/26.2 |
| 8,566,170 B1 | 10/2013 | Joseph |
| 2002/0161645 A1 | 10/2002 | Walker et al. |
| 2003/0208387 A1 | 11/2003 | Russell et al. |
| 2004/0162130 A1 | 8/2004 | Walker et al. |
| 2004/0205003 A1 * | 10/2004 | Carpenter et al. ............... 705/26 |
| 2005/0160004 A1 | 7/2005 | Moss et al. |
| 2005/0160014 A1 | 7/2005 | Moss et al. |
| 2005/0187010 A1 | 8/2005 | Baerlocher |
| 2005/0197893 A1 | 9/2005 | Landau et al. |
| 2006/0121966 A1 | 6/2006 | Baerlocher |
| 2006/0155598 A1 | 7/2006 | Spurr et al. |
| 2006/0212362 A1 * | 9/2006 | Donsbach et al. ............... 705/26 |
| 2006/0223505 A1 | 10/2006 | Starr |
| 2006/0277118 A1 * | 12/2006 | Keohane et al. ............... 705/27 |
| 2007/0112919 A1 | 5/2007 | Lyle |
| 2008/0046267 A1 | 2/2008 | Romano et al. |
| 2008/0052169 A1 | 2/2008 | O'Shea |
| 2008/0195503 A1 | 8/2008 | Habeishi |
| 2008/0208834 A1 * | 8/2008 | Boyer et al. ...................... 707/5 |
| 2008/0235594 A1 | 9/2008 | Bhumkar et al. |
| 2008/0288362 A1 | 11/2008 | King |
| 2009/0055255 A1 | 2/2009 | Obrea |
| 2009/0125414 A1 * | 5/2009 | Kleinrock et al. ............... 705/26 |
| 2010/0057530 A1 | 3/2010 | Parivash et al. |
| 2010/0192066 A1 | 7/2010 | Wu |
| 2010/0287030 A1 * | 11/2010 | Sinha et al. ...................... 705/10 |
| 2010/0299269 A1 | 11/2010 | Martin |
| 2011/0004497 A1 * | 1/2011 | Mortimore et al. ............... 705/5 |
| 2011/0071890 A1 * | 3/2011 | Hart et al. ................. 705/14.16 |
| 2011/0131109 A1 | 6/2011 | Pappas et al. |
| 2011/0161150 A1 | 6/2011 | Steffens |
| 2011/0276400 A1 | 11/2011 | Kurnit |
| 2011/0313882 A1 * | 12/2011 | Barthes ...................... 705/26.25 |
| 2012/0079365 A1 | 3/2012 | Yoshida |
| 2012/0095815 A1 | 4/2012 | Glaser |
| 2012/0136683 A1 * | 5/2012 | Wallace et al. ...................... 705/6 |
| 2012/0166268 A1 | 6/2012 | Griffiths |
| 2012/0226573 A1 * | 9/2012 | Zakas et al. ................... 705/26.2 |
| 2012/0259687 A1 * | 10/2012 | Kajamohideen et al. ...................... 705/14.23 |
| 2012/0284100 A1 | 11/2012 | Goldberg |
| 2012/0310719 A1 | 12/2012 | Hammerstad |
| 2013/0132192 A1 | 5/2013 | Krukowski |
| 2013/0297400 A1 | 11/2013 | Nagarajan |
| 2014/0019244 A1 * | 1/2014 | Gundapaneni et al. ... 705/14.54 |
| 2014/0058872 A1 * | 2/2014 | Sandholm et al. .......... 705/26.1 |
| 2014/0095222 A1 * | 4/2014 | Sutcliffe ............................ 705/5 |
| 2014/0095276 A1 * | 4/2014 | Sutcliffe ...................... 705/14.1 |
| 2014/0122284 A1 | 5/2014 | Bockh |
| 2014/0257945 A1 | 9/2014 | Sandridge |
| 2014/0278984 A1 | 9/2014 | Liu |
| 2015/0082328 A1 | 3/2015 | Bradley |
| 2015/0088627 A1 * | 3/2015 | Bate ................. G06Q 30/0217 705/14.19 |
| 2015/0100398 A1 | 4/2015 | Narayanaswami |
| 2015/0262216 A1 | 9/2015 | Aziz |
| 2015/0294340 A1 | 10/2015 | Luk |
| 2016/0063537 A1 | 3/2016 | Kumar Goel |

* cited by examiner

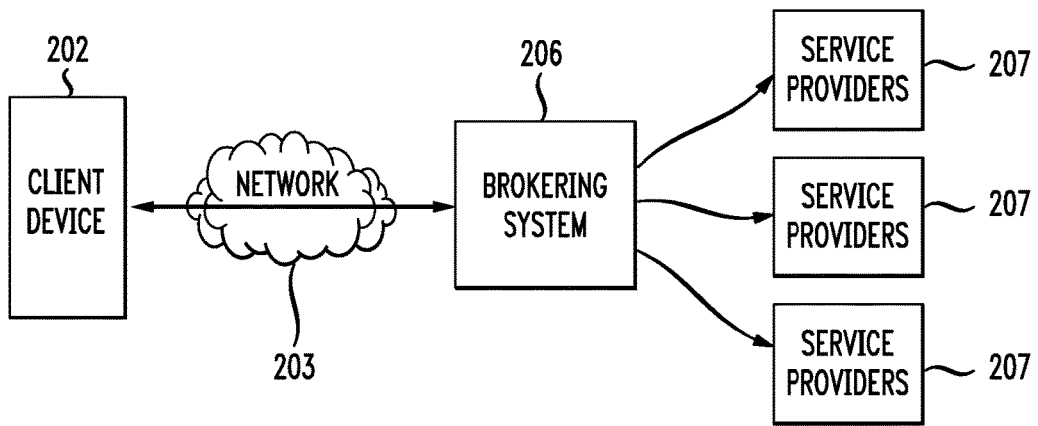
FIG. 2A1
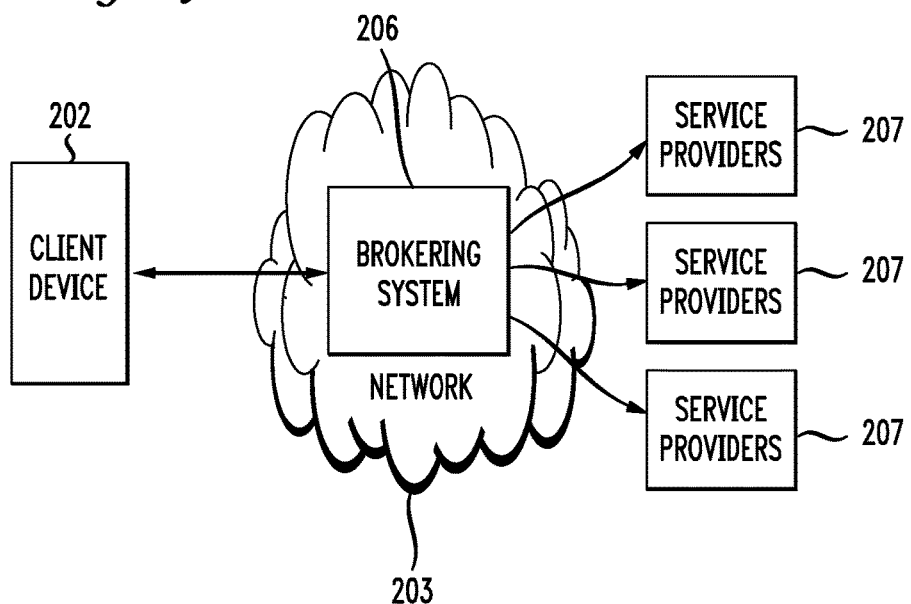
FIG. 2A2

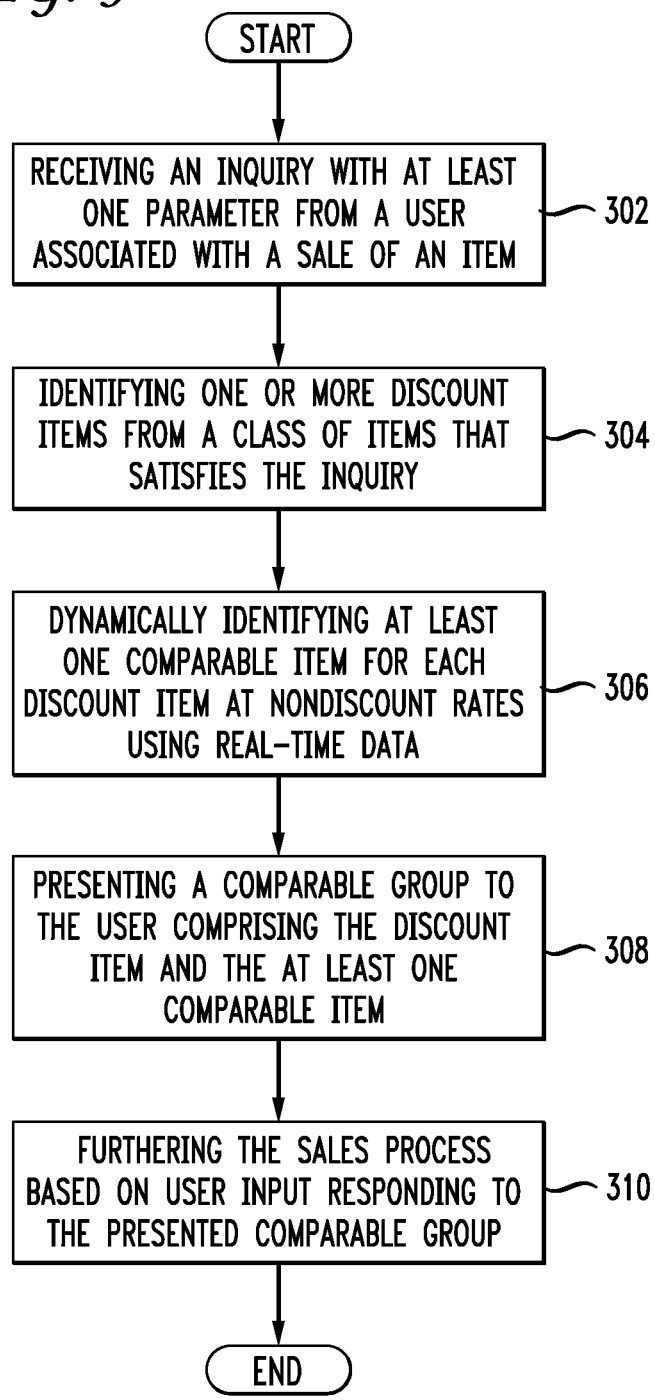

504 — Caribbean Beach Package
506 — 6 Days/5 Nights – Double Occupancy
508 — Surprise Option Price of $899
510 — (save up to 36% by being flexible)

512 —

| Full Retail Price | Destination | Hotel | Location | Room Type | Meal Type | Star rating |
|---|---|---|---|---|---|---|
| ~~$1368~~ | St. Thomas (description) | Westin (description) | Beachfront | Direct ocean view –Deluxe | All-Inclusive | 5 Star |
| ~~$1388~~ | St. Lucia (description) | Hilton (description) | Beachfront | Direct ocean view –Deluxe | All-Inclusive | 5 Star |
| ~~$1328~~ | St. John (description) | Hyatt (description) | Beachfront | Direct ocean view –Deluxe | All-Inclusive | 5 Star |

514 — Buy Now
Any of these comparable goods is suitable at $899

516 — Eliminate
Remove one of the above comparable goods for $40

518 — Hedge
Purchase the ability to cancel the transaction at any later date for $50

| | | | | | | |
|---|---|---|---|---|---|---|
| ~~$1388~~ $899 | St. Lucia (description) | Westin (description) | Beachfront | Direct ocean view -Deluxe | All- Inclusive | 5 Star |

604 — Thank you for making a reservation with us, your confirmation number is 2U4X3S.

606 — This is your purchased package for $899, you saved 36% over retail price!

608 — [table above]

610 — The Westin St Lucia is on the idyllic Caribbean island of St. Lucia in the West Indies. This Luxury condominium resort features 92 two-bedroom units and 16 three-bedroom units, totaling 232 guest rooms, all with views of Praslin Bay. Amenities include an 18-hole Greg Norman designed golf course managed by Troon, Clubhouse, a 9,125 square foot spa with outdoor meeting space, a 50 slip marina, marina village, additional mixed-use components and more. Starwood manages the hotel and condominiums under its upper upscale brand, Westin Hotels & Resorts.

Sales Price:   $856.19
612 — Tax:           $42.81

Total Price:   $899.00

Hotel Booking Confirmation

FIG. 7

Television Offers

Size
○ 37"
● 42"
○ 50
○ More than 50"
○ Any
— 704

Technology
○ DLP
○ PLASMA
● LCD
○ Any

Resolution
○ EDTV (852x480)
○ HDTV 720p (1280x720)
● HDTV 1080p (1920x1080)
○ Any Other Features
☒ picture in picture
☐ remote
☒ HDMI
☐ DVI
☐ TV Turner
☐ Wall-Mountable
— 706

SEARCH — 708

804 — Television Offers
806 — 42" LCD 1880p HDTV
808 — Surprise Option Price of $1169
810 — (save up to 44% by being flexible)

| Full Retail Price | Brand | Tech | Size | Resolution | # of HDMI | Contrast Ratio |
|---|---|---|---|---|---|---|
| ~~$1799~~ | Phillips | LCD | 42" | 1080p | 2 | 8,000:1 |
| ~~$1999~~ | LG | LCD | 42" | 1080p | 3 | 10,000:1 |
| ~~$2099~~ | Sharp | LCD | 42" | 1080p | 2 | 1,200:1 |

812

814 — Buy Now
Any of these comparable goods is suitable at $1169

816 — Eliminate
Remove one of the above comparable goods for $200

818 — Hedge
Purchase the ability to cancel the transaction at any later date for $100

Television Purchase Confirmation

904 — Thank you for making a purchase, your confirmation number is 1Zxxxxxx.

906 — This is your purchased television for $1169, you saved 42% over retail price!

908 —
| ~~$1799~~ $1169 | Phillips | LCD | 42" | 1080P | 2 HDMI | 8,000:1 Contrast Ratio |

910 — Enjoy the ultimate viewing experience of this Philips Flat TV with Perfect Pixel HD Engine, Ambilight 2 Channel and Full HD 1080p display. Enjoy your multimedia content with the built in USB.

Sales Price: $1100.23
912 — Tax: $68.77

Total Price: $1169.00

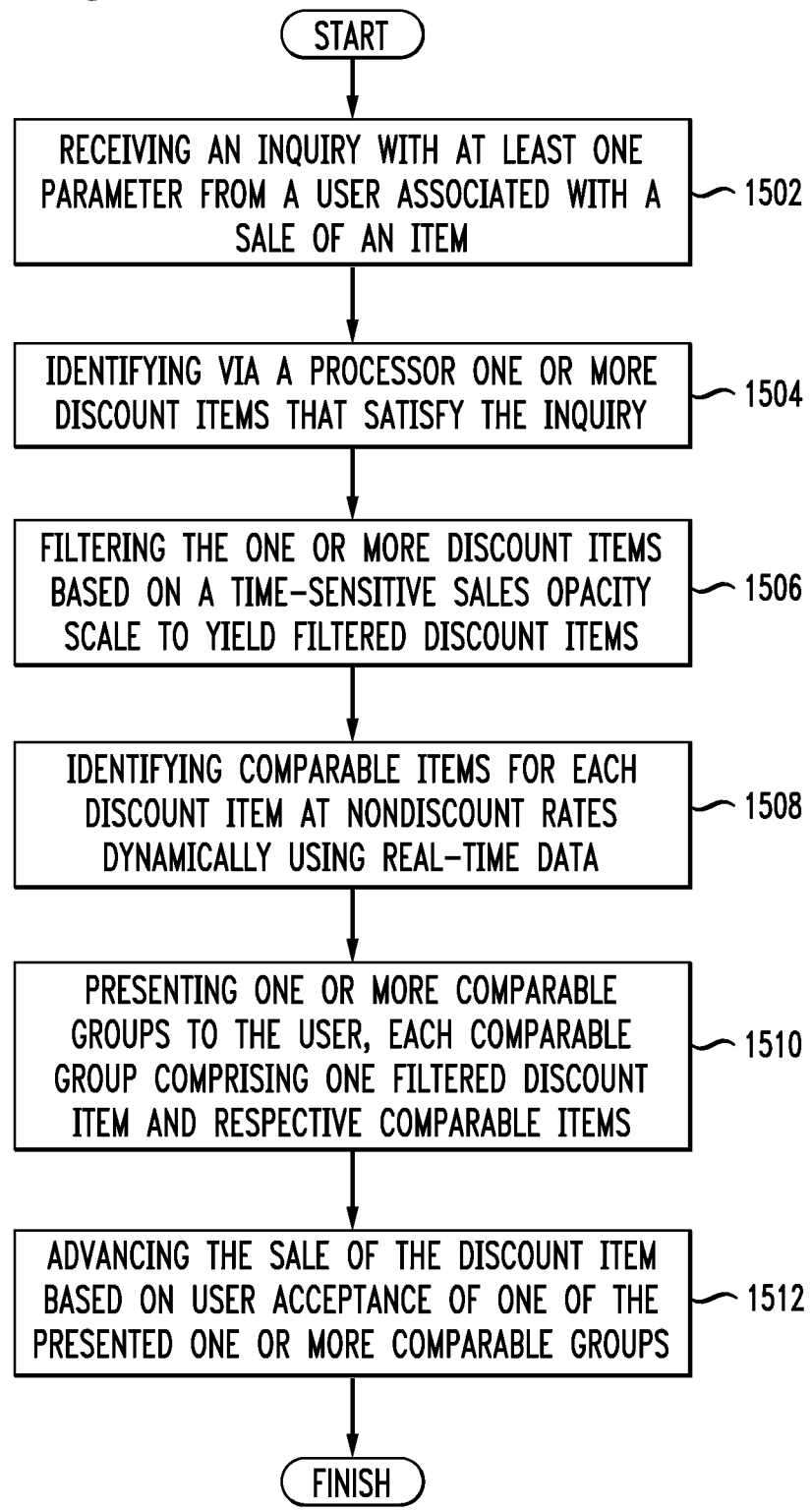

SYSTEM AND METHOD FOR CONDUCTING SEMI-OPAQUE SALES WITH ITEM BUNDLES

PRIORITY

This application is a continuation-in-part of U.S. patent application Ser. No. 14/259,482, filed 23 Apr. 2014, which is a continuation of U.S. patent application Ser. No. 13/908,444, filed 3 Jun. 2013, now U.S. Pat. No. 8,719,084, issued 6 May 2014, which is a continuation of U.S. patent application Ser. No. 13/158,026, filed on 10 Jun. 2011, now U.S. Pat. No. 8,458,021, issued 4 Jun. 2013, which is a continuation-in-part of U.S. patent application Ser. No. 12/496,286 filed on 1 Jul. 2009, now U.S. Pat. No. 8,224,694, issued 17 Jul. 2012, which is a continuation-in-part of U.S. patent application Ser. No. 11/776,019 filed on 11 Jul. 2007, now U.S. Pat. No. 8,185,434, issued 22 May 2012, each of which is herein incorporated by reference in its entirety.

BACKGROUND

1. Technical Field

The present disclosure relates to the field of conducting sales transactions, and more particularly conducting semi-opaque sales transactions.

2. Introduction

Currently, many on-line systems complete sales transactions in an opaque manner for various reasons. For example, the travel industry extensively uses opaque sales by withholding details about a product until after the purchase. Travel service providers such as hotel providers, airlines, and car rental companies maximize revenue by selling the correct balance of inventory at a higher price while not alienating customers that are willing to pay a lower price for the service. The objective is to encourage retail customers to pay the full price while garnering incremental customers that will pay a reduced price but would not pay full price. Yield management is the study of how to reach this optimal balance.

Yield management can impact travelers' sensitivity to price because many travelers have learned from experience that the price for the same service can vary hugely. Statistics show that travelers search on multiple travel websites or call multiple travel call centers when planning trips. Travelers tend to distrust any one specific source until they have checked the rate across multiple sources.

Many travel service providers have become wise to this phenomenon and have introduced a rate-parity requirement across multiple sales channels. Rate parity is the concept that the service should be the same price anywhere the traveler searches for the service. To further this objective, service providers have introduced low-rate guarantee programs to ensure that rate-parity exists across all sales channels.

Service-providers can distribute their distressed or excess inventory at a discount to a variety of third-party aggregation sites (such as Expedia®, Travelocity®, and Orbitz®) to maximize occupancy as long as their full rate sales channels are not disrupted. However, service-providers hesitate to do so because they do not want to undercut their existing pricing. Specifically, a traveler can be willing to pay the full rate for the service because of loyalty or familiarity but can find a discounted rate offered by a third-party acceptable.

This is where opaque sales methods apply. Opaque sales methods do not reveal the specific details of the product or service until after it is purchased. Specific examples of companies that employ opaque sales methods are Priceline® and Hotwire®. Priceline and Hotwire both describe the item to be purchased in general terms without specifically identifying the exact details of either the product or service provider. The customer is informed of the details only after committing to purchase or after actually purchasing. Because the discounted offers are so generic in nature, many travelers are uncomfortable blindly purchasing a totally opaque travel service, even at discounted rates, because they are not confident in the quality or reputation of the purchased item. As a result, many travel service providers are limited in their ability to sell their excess inventory.

Those of skill in the art in the travel industry, such as travel agents, often show a customer a group of hotel brochures and tell the customer that a particular package includes one from the group of hotels displayed in the brochures. The travel agent later selects one from the group based on availability or other factors. Further, the travel agent practice of showing hotel brochures can not fully disclose comparable details between the hotels and a customer can know nothing about the hotels. A customer has no assurances beyond that of the travel agent as to the attributes and qualities of the hotels represented in the brochures. Travel agents cannot feasibly maintain groups of current brochures for every possible location, either.

While the problems with opaque marketing are easily applicable in the travel industry, various other industries also employ opaque marketing techniques. Yet other industries are eager to enjoy the benefits of opaque sales, i.e. increasing sales of excess items, but are hesitant because of perceived potential downsides of opaque marketing.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and tangible computer-readable storage media for conducting sales transactions. An example method embodiment for conducting sales includes receiving an inquiry with at least one parameter from a user associated with a sale of an item, identifying a discount item from a class of items that satisfies the inquiry, dynamically identifying at least one comparable item to the discount item at nondiscount rates using real-time data, presenting a comparable group to the user including the discount item and the at least one comparable item, furthering the sales process based on user input responding to the presented comparable group, and wherein the presented comparable group does not identify to the user which is the discount item and which is the at least one comparable item. Also disclosed herein is a method further including receiving a request from the user for multiple sub-items associated with the item, and engaging in a dialog with the user to enable payment for each of the multiple sub-items with one of a multiple payment types. For example, the system can receive a request from the user, after the acceptance of the semi-opaque offer, for a sub-item associated with the first bundle of items and can engage in a dialog with the user to enable payment for the sub-item.

This sales method is a semi-opaque approach as opposed to the opaque approach mentioned in the introduction. Opaque sales are transactions where all the details of the object of the transaction are withheld until after the transaction is complete. In common terms, an opaque sale can be completing a purchase "sight unseen." Semi-opaque sales are transactions where all the details of the object of the transaction are disclosed as in a non-opaque sale, but the user is still not informed as to exactly which item will be the object of the transaction. In this manner, details of the object of the transaction are fully disclosed, but one or more key pieces of information are withheld, for example, which object out of a list of objects is to be the eventual object of the transaction.

Another exemplary embodiment is a network based service which is accessible, for example, via the Internet. In this embodiment, an entity will operate at least one computing device that communicates with a user on a client device to conduct a sale of a product and/or service. In this regard, the computing device will present information to the end user and receive input from the end user in the manner described herein. Upon completing a sale, the computing device can then communicate with the manufacturer or service provider to enable the end user to receive the product or service purchased.

As part of the interaction with the user, the system can enable the user to request an item (such as a hotel room, widget or service) and also request multiple sub-items associated with the item. Examples of sub-items can be hotel rooms associated with a hotel, or multiple widgets (associated with a widget), or a particular type of service, such as accounting and legal services as multiple sub-items to the item of professional services. The system can engage in a dialog with the user to enable payment for each sub-item via a separate credit card. A preferable point in the semi-opaque interaction with the user would be after the user accepts one of the group of presented options and before the system presents the user with notification of which item has been purchased. It can be during this preferable point in the interaction that the system receives the information regarding how the user or multiple users will pay for one or more of the sub-items via different credit cards.

In some situations, bonuses provide greater incentive for users than discounts. Users feel like they have 'won' something when they get a benefit or perk. In order to leverage this aspect of human psychology, the items offered via a semi-opaque process can be 'bundles' of items, such as hotel lodging plus credit at a hotel spa, ski passes, or 18 holes of golf at a golf course near to the hotel. In this variation, the 'discount' price in the semi-opaque offer is the full price of just the hotel room. Hotels receive a larger amount of money than simply offering a discount, users have the psychological feeling of a 'win,' hotels can promote additional services and partnerships with other businesses, and so forth. This variation on semi-opaque sales can benefit not only purchasers, but many other parties. Bundles are not only limited to hotel lodging, but can extend to many other types of items and services. For example, the system can present, in a semi-opaque offering, a bundle of a television and a year of cable television service, where the discount price is the full price of the television.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A1 illustrates a first sample semi-opaque sales method;

FIG. 2A2 illustrates a second sample semi-opaque sales method;

FIG. 3 illustrates a method embodiment for conducting semi-opaque sales;

FIG. 5 illustrates a screenshot of a results page in a semi-opaque travel site;

FIG. 6 illustrates a screenshot of a confirmation page in a semi-opaque travel site;

FIG. 7 illustrates a screenshot of an inquiry page in a semi-opaque electronics site;

FIG. 8 illustrates a screenshot of a results page in a semi-opaque electronics site;

FIG. 9 illustrates a screenshot of a confirmation page in a semi-opaque electronics site;

FIG. 15 illustrates an exemplary method embodiment for semi-opaque offers with a variable opacity scale.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

Figure 1:
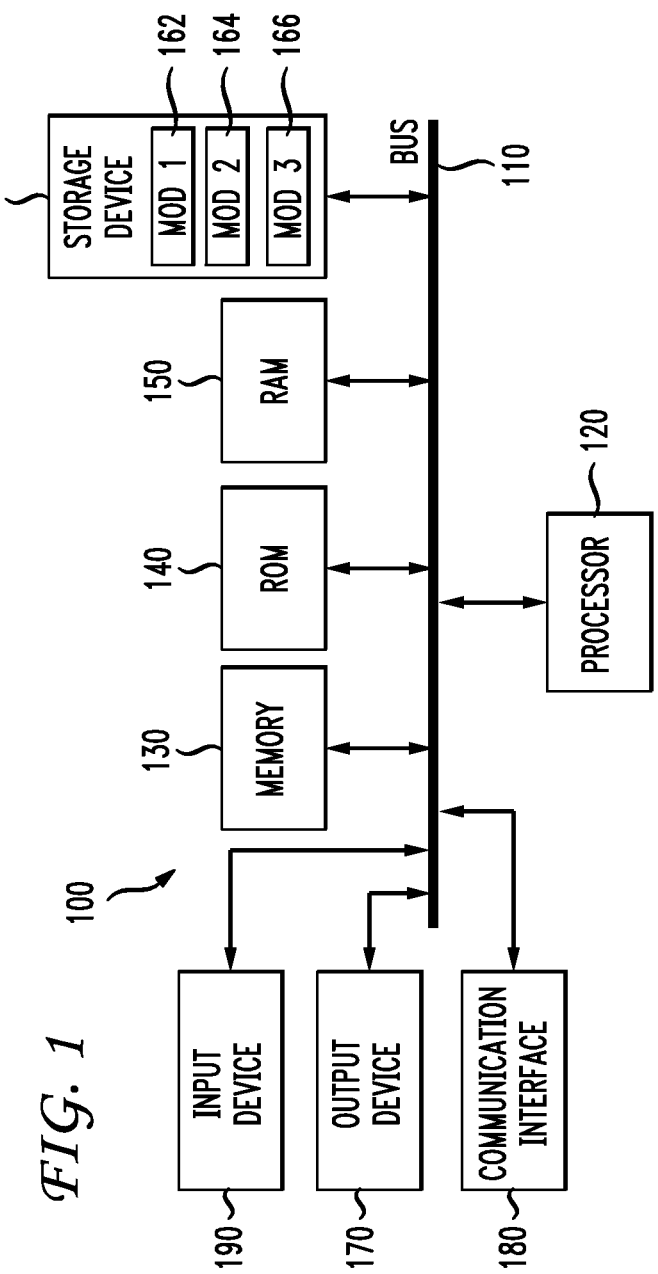
FIG. 1 illustrates a basic system or computing device embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 can be available for use as well. It can be appreciated that the disclosure can operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 can essentially be a completely self-contained computing system, containing multiple cores or processors, a bus, memory controller, cache, etc. A multi-core processor can be symmetric or asymmetric.

The system bus 110 can be any of several types of bus structures including a memory bus or memory controller, a peripheral bus, and a local bus using any of a variety of bus architectures. A basic input/output (BIOS) stored in ROM 140 or the like, can provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, can also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 can be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here can easily be substituted for improved hardware or firmware arrangements as they are developed.

For clarity of explanation, the illustrative system embodiment is presented as including individual functional blocks including functional blocks labeled as a "processor" or processor 120. The functions these blocks represent can be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments can include microprocessor and/or digital signal processor (DSP) hardware, read-only memory (ROM) 140 for storing software performing the operations discussed below, and random access memory (RAM) 150 for storing results. Very large scale integration (VLSI) hardware embodiments and custom VLSI circuitry in combination with a general purpose DSP circuit, can also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules can be stored on the storage device 160 and loaded into RAM 150 or memory 130 at runtime or can be stored in other computer-readable memory locations.

Having disclosed some basic system components, the disclosure now turns to the exemplary method embodiment shown in FIG. 2A1. For the sake of clarity, the method is discussed in terms of an exemplary system such as is shown in FIG. 1 configured to practice the method. FIG. 2A1 illustrates an example configuration for a computer-implemented semi-opaque sales method. For clarity, the methods are discussed in terms of a system, such as the exemplary system shown in FIG. 1, configured to practice the method. A user communicates via a client device 202 with the brokering system 206 across a network 203. The client device can be a telephone, personal digital assistant (PDA), smartphone (such as an iPhone® or Blackberry®), laptop, desktop, call center, or any other suitable device. The brokering system 206 can interact with one or more service providers 207. The service providers 207 can be entities that manufacture goods, distribute goods, provide services or any combination of these. One example of a service provider is a hotel chain through which the broker system 206 books rooms. The brokering system 206 can take orders, complete sales itself, and pass the order information to the service providers in the role of a broker. As a broker, the brokering system 206 can also not complete any transactions at all, but can connect interested customers with service providers directly or by arranging for future communication via phone or email. As a broker, the brokering system 206 can also complete sales and report those sales to the service providers in return for a commission. Many broker/service provider arrangements are contemplated as within the spirit and scope of this disclosure.

The brokering system 206 in example 2A1 resides across a network from the client devices, but can reside in many other configurations, such as the configuration illustrated in FIG. 2A2. FIG. 2A2 illustrates another example configuration for a computer-implemented semi-opaque sales method. The brokering system 206 can reside entirely within the network 203. The brokering system 206 can be implemented in one physical location or can be spread out among multiple locations or implemented in multiple pieces of hardware and/or software. Multiple systems 206 can provide multiple tasks, perhaps one for each industry area (i.e. one system for travel services, one system for insurance, one system for legal services, etc), or one for each service provider (one for Geico®, one for Allstate®, one for Progressive®). If multiple systems are used for each provider within one industry, each system can share the same real-time information regarding comparable items.

Figure 2B:
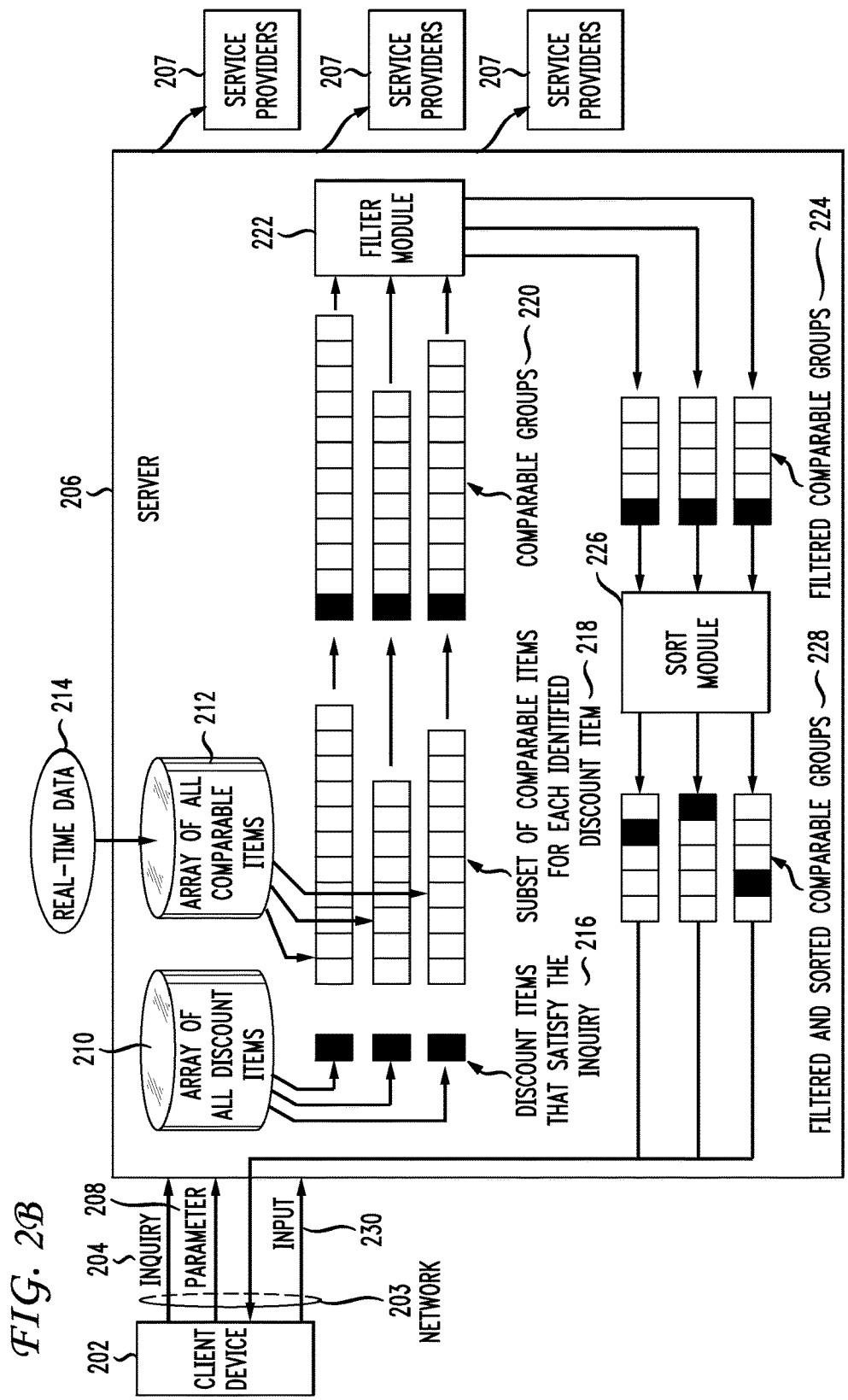
FIG. 2B illustrates a detail view of FIGS. 2A1 and 2A2.

FIG. 2B illustrates a detail view of the implementation of the brokering system "black box" in FIGS. 2A1 and 2A2. FIG. 2B illustrates an example brokering system for selling hotel room reservations to users, although the system and method can apply to any product, service, or combination thereof. A user can interact with the system by means of a client device such as a laptop, desktop, cellular phone, personal digital assistant (PDA), etc. that communicates over a network 203 with the server 206. A client device 202 first can open a website operated by the server 206 and enter an inquiry 204 directed to the server regarding a hotel reservation. Although a web interface is one possibility in this example, the client device 202 and server can interact in any number of ways, including via a computer terminal, phone interface, interactive voice response (IVR) system, or call center. The server 206 can be a single computer, a portion of a single computer, a group of computers, or any other configuration capable of performing the necessary steps. A user can enter the inquiry by filling a form on a webpage, clicking on a link offering a package deal, speaking to a customer service representative over a phone, or any other form of interaction between a client device and a user. The inquiry is accompanied with one or more parameters 208 for the inquiry. The parameters can be explicit or implicit. One explicit parameter can be if the user 202 checks a checkbox signifying "Only show me rooms with a king bed." One implicit parameter can be if a client device clicks on a link for an advertised package deal to the Bahamas. In that case, the client device 202 expressed an understood, implicit parameter that the hotel be located in the Bahamas. Some possible parameters for a hotel reservation include location, star rating, whether or not breakfast is offered, a range of dates, swimming pool availability, concierge services, valet, room service, etc. An example of more than one parameter in the context of hotel sales is a user requesting a four-star hotel with a swimming pool, continental breakfast, and near a movie theater. If the item for sale is an automobile, some possible parameters might include color, gas mileage, leather interior, engine size, airbags, etc. Any shared feature which can be compared between like items can serve as a parameter.

The server then selects from an array of all discount items 210, one or more discount items that satisfy the parameters of the inquiry 216. FIG. 2B shows three discount items 216 being selected that satisfy the inquiry for a Caribbean travel package, and the three discount items that satisfy the inquiry are hotels in St. Lucia, St. Thomas, or St. John. If the user requests ski resorts, the system can select Vail Four Seasons, Big Sky Ritz, or Park City Hyatt. Discount items can be multiple destinations or a single destination, if the destination or destinations fit the parameters of the inquiry.

Next the server analyzes real-time data 214 to create an array of all comparable items 212. In our example, some comparable items can be Marriott®, Comfort Inn®, Embassy Suites®, and Ramada®. Real-time data 214 can be updated by a third party, can be obtained directly from the service or product provider, or can be obtained any other way. Real-time can have a flexible meaning Real-time in the context of extremely time-sensitive products or services where prices fluctuate quickly based on availability and demand, like hotel or airline reservations, can mean that the data are no older than 5 minutes. With less time-sensitive products or services where prices do not fluctuate on a moment's notice, like consumer electronics or furniture, real-time data can mean that the data are no older than 72 hours. The threshold for determining what real-time means can depend on the type of product or service offered. One skilled in the art will know how to implement real-time as it relates to sales of a particular product or service.

For each discount item 216 that satisfies the inquiry 204, the server 206 can dynamically select a subset of comparable items 218 from the array of all comparable items 212, based on at least one attribute of each discount item. Each subset can contain a variable number of items, depending on how many items are returned from the array of all comparable items. The server combines each discount item 216 with the respective subset of comparable items 218 into comparable groups 220. The comparable groups can be processed by a filter module 222 into filtered comparable groups 224. The filter module can be a separate computing device or devices, a routine to perform filtering, or anything else capable of filtering the comparable groups. The filter module can filter comparable groups in a number of ways. If the filter module is intended to return the best five results, then the filter module allows one discount item and the best five minus one (or four) items in the comparable group. The filter module can filter based on additional parameter(s) or explicitly exclude designated items or item attributes. The system can also filter subsets of comparable bundles of items using a filter parameter. The subset can be sorted based on an attribute value associated with contents of the subset. The method can include expanding the filter parameter when insufficient comparable bundles of items are returned after the subsets of comparable bundles of items are filtered.

Returning to the hotel example, if a buyer seller specifically requested that a particular attribute or item not be included then the system can filter out items matching the name Motel 6® or if a buyer requested valet service, the system only allows hotels with valet service to pass through the filter 222. A seller, or provider of a discount item, can also choose to employ filtering. A seller can request that their product or service not be compared with particular other items. For example, if Hilton® were a service provider, Hilton can request that only 3 or 4 star hotels be compared with Hilton. If the filter module is too aggressive and the comparable group is of insufficient size, parameters can be broadened to allow more items in the filtered comparable groups.

The filtered comparable groups 224 can be sent to a sorting means 226 to be sorted in to filtered and sorted comparable groups 228. The sorting means 226 can be configured to sort in any desired order. Sorting of comparable groups of hotels can be done in ascending or descending order of price, star ranking, amenities, distance from desired location, etc. Items in comparable groups can be sorted by any of their attributes or in any other order. Although it can appear counterintuitive, the sorting means can even randomize the filtered comparable group to veil the identity of any discount items from the user. The filtered and sorted comparable groups can be presented to the user in any of a number of ways, for example, via a computer terminal, web interface, phone interface, interactive voice response (IVR) system, call center, etc. The actual retail prices can be presented with the filtered and sorted comparable groups for the user to reference with a discount price, if desired.

When the sorted and filtered comparable groups 228 are presented to the user, in order to achieve semi-opaque results, any discount items 216 preferably remain unidentified as the discount item so that the user does not know which items can actually be offered and which, if any, items are merely comparable items 218. All items in the comparable group can be displayed at full retail price or the user can also be allowed to select a number of items in the comparable group that the user is interested in, and receive a price quote for each selected item in the comparable group.

The system can then prompt the user with a message such as "If any of the listed hotels is acceptable at a discounted price of $300, click OK." The user sends input 230 to the server 206 responding to the one or more presented comparable group. The input can be a mouse click, filling out credit card information, a verbal acceptance to a call-center employee, biometric confirmation like a fingerprint or retina scan, or any other means of input and can include a multi-modal input. The server 206 can then further the sale based on the received user input 230. Some of the possible ways to further the sale include disclosing which item in the presented comparable group is the discount item that the user has agreed to purchase, gathering credit card or other payment information, transferring the user to the actual manufacturer or service provider, taking size information (if an article of clothing is to be sold), gathering delivery information, recording personal information about the customer, displaying a confirmation page, sending a confirmation email, or anything else that incrementally moves the customer closer to completing the transaction. This list of ways to further the sale is not necessarily comprehensive and those of skill in the art will recognize other suitable alternatives. Some ways of furthering the sale do not apply to all of the types of products offered, for example, gathering a T-shirt size of a customer can be appropriate to further the sale of a T-shirt, but inappropriate to further the sale of prepaid legal services.

In one variation, the system does not disclose the purchased discount item until a predetermined date or time after the user has agreed to purchase. The predetermined date or time can be absolute or relative. An example of an absolute predetermined date or time is that the system reveals the purchased items sold between March 1 and March 7 on March 10. A relative predetermined date or time can be withholding the identity of the purchased discount item until ten days after the purchase. The system can time-delay in this manner to prevent users from "gaming" the system where one individual commits to a sale for the purpose of discovering which item in the comparable group is a discount item and spreading that information to others, negating the semi-opaque aspect.

In another aspect, the system presents the user an option, either for free or for a fee, to eliminate a certain number of items in the presented comparable group. This variation can serve to provide users with further assurances that they will be comfortable with the actual item purchased. If a fee is charged for this service, the fee can be a flat fee, like $50, or based on the difference between the lowest and the next lowest prices for the discount item, if more than one discount item is available in the comparable group, or based on any other factor. The system can retain the fee or apply all or part of the fee as a credit towards the eventual purchase price. The system can determine the number of items by calculating the most items that can be eliminated while retaining at least one discount item in the comparable group, and selecting any number up to that limit. In this way, a user can eliminate items from the comparable group that the user feels are potentially unfavorable so the user feels more comfortable with the transaction.

In yet another variation, the system presents an option to the user, either for free or for a fee, to terminate the sales process and/or any sales commitments at a later point. If a fee is required, the system can retain the fee or apply it as a credit towards the eventual purchase price. This variation allows users to be more confident that they will be satisfied with their purchase. Users can effectively "purchase" confidence in the sale by retaining the freedom to back out at a later time if the user is unhappy with the discount item.

With goods that are easily divisible, such as a hotel room package being divided into multiple rooms for multiple nights, more than one customer can combine and purchase the package together, but pay for each respective portion individually. The system can gather credit card numbers or other payment means for each individual in a party. Some items do not naturally lend themselves to multiple party purchases. For example, purchasing televisions, as discussed below. Televisions are usually singularly owned (or perhaps owned by a married couple), so unrelated consumers do not typically combine purchasing power on a television. However, if 3 televisions or other large-ticket item were sold at a discount as a package, a multiple party purchase can apply.

FIG. 3 illustrates a method embodiment for conducting semi-opaque sales. The computer-implemented method can be practiced in various medium interfaces, such as computer terminals, internet, telephones, interactive voice response systems, call centers, portable computing devices (such as iPhone®, Palm® or Windows Mobile® personal digital assistant, RIM Blackberry®, cellular phone, etc.), multi-modal interactive devices, etc. First, the method receives an inquiry with at least one parameter from a user associated with a sale of an item (302). In a hotel sales context, the inquiry parameters can include dates, a city, specific regions in a city, amenities like pool or continental breakfast, star rating like 2-star or 4-star, nearby facilities (i.e. restaurants, theaters, metro, etc.), or other parameters. Second, the method identifies one or more discount items from a class of items that satisfies the inquiry (304). Discount items can be, for example, distressed or excess inventory from hotels that desire to boost occupancy through yield management by selling rooms at a lower rate to customers who would not otherwise buy a room at full price. One of the identified discount items will ultimately be sold to the customer if the customer agrees to the transaction. Third, the method dynamically identifies at least one comparable item for each discount item at nondiscount rates using real-time data (306). The system can pull real-time data from various hotel websites, a travel services database, distribution information for products, and/or other sources. The system examines real-time data to identify items that are comparable to the discount item in at least one attribute. The comparable items can be the same star ranking if the inquiry is based on a star ranking, or the comparable items can be in the same neighborhood, if the inquiry is based on a specific location. The comparable items should satisfy the inquiry and be substantially similar to the respective discount item.

Fourth, the method presents a comparable group to the user including the discount item and the at least one comparable item (308). The system presents the discount item and comparable items to the user as a group, not a list from which to select a desired item. In addition to the group itself, the system can present specific details about each item in the group if they are available. Some specific details can include address, features, amenities, pictures, reviews, or any other information considered useful in making a purchase decision. These additional details can put the user at ease about a decision to accept any of the items in the group. In this manner, the sales method is semi-opaque because the user sees the item she is about to purchase, but does not know which one it is. The user does not go into the transaction blindly like the completely opaque models used by Priceline or Hotwire, which completely hide the brand and product by disclosing only general information about the product to be purchased. Completely opaque sales methods can alienate users who are uneasy about the unknown. In a semi-opaque sales method, the user can view the details of each item in the comparable group, such as name, address, pictures, descriptions, and the user can carefully research the items through a third party if she desires, even though the user does not know which item in the comparable group is a discount item. Despite this, the user can be confident that he would be comfortable with each of the items in the comparable group, so the unknown doesn't take him by complete surprise. Since each item in the comparable group satisfies the inquiry, the user should already more or less expect items with attributes of the comparable group.

Fifth, the method furthers the sales process based on user input responding to the presented comparable group (310). Furthering the sales process can include making the sale of the hotel room, charging a deposit for the hotel room and charging the rest later, directing the user on to a discounted hotel website as a broker, or some other similar act that at least incrementally moves the user closer to a completed sale. User input can be clicking a button on a web page that says "Any of these items is acceptable. I agree to purchase one of these items at the discounted price," a spoken agreement with someone working in a call center, or communicating credit card information. The user input can be any of a variety of ways to accept the offer. The system can identify the discount item to the user at any time, but in a semi-opaque system, the most advantage is preserved by withholding identification until after the user agrees that any item in the comparable group is acceptable and commits to purchase one of the items in the comparable group for the discount price.

Because the semi-opaque method guarantees that the traveler is agnostic to the specific item or service provider, the provider of the discount item is assured that the sale is incremental and does not diminish the number of customers willing to pay full price. Further, the travel service-provider can continue to sell the full rate product directly and employ the rate-parity guarantee if the traveler must have their specific service.

This semi-opaque sales method can be used to sell hotels, airfare, travel packages, consumer electronics, computers, insurance, loans, legal services, medical services, furniture or any other product or service that is quantifiable into specific attributes which can allow comparable groups to be generated around a discount item.

Figure 4:
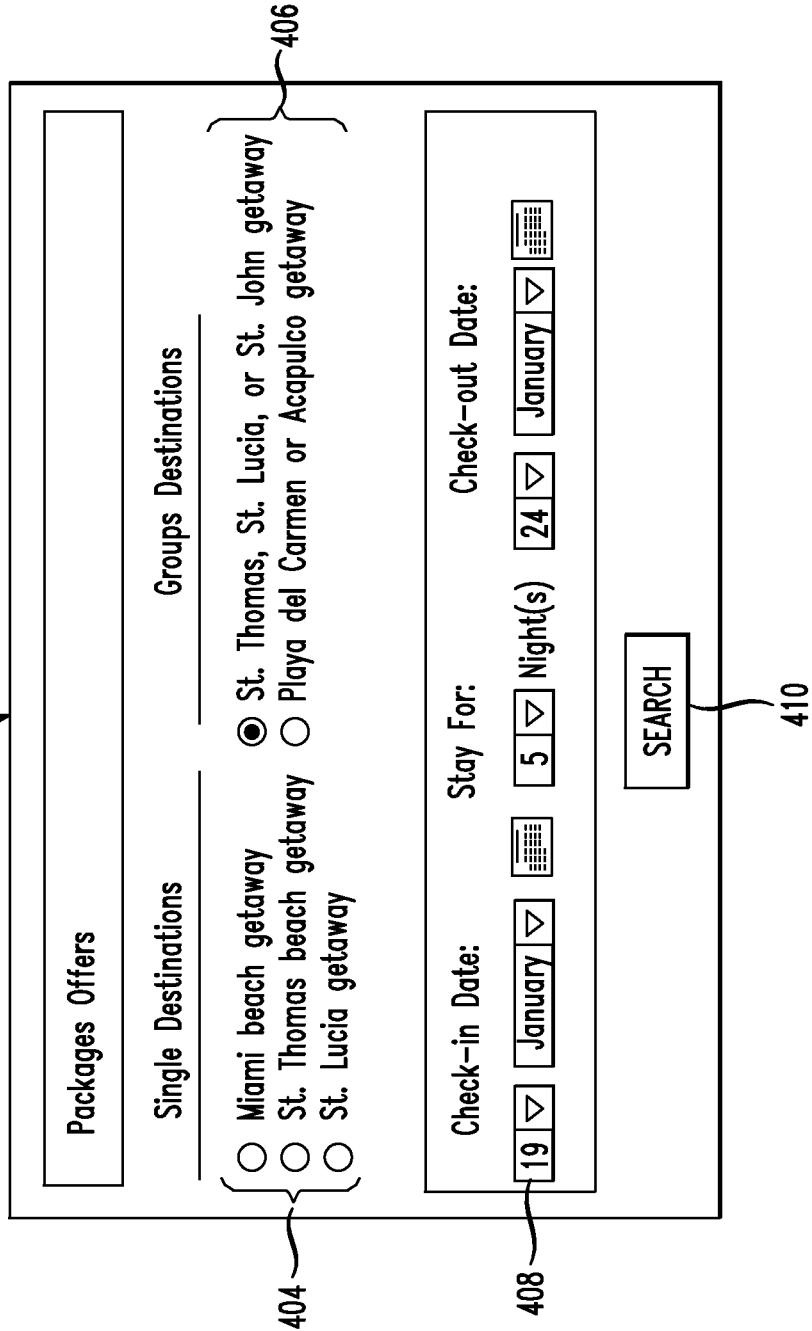
FIG. 4 illustrates a screenshot of an inquiry page in a semi-opaque travel site.

FIG. 4 represents a sample screen shot of how a user might inquire about an item. FIG. 4 illustrates a web browser but as has been discussed, the disclosure can be practiced in a number of ways, including but not limited to computer terminals, internet, telephones, interactive voice response systems, call centers, etc. The web page 402 can contain one or more ways to select one or more parameters 404, 406, 408 for a group of items. Other means of indicating parameters can include a text search field that allows users to search across all items, touchtone or spoken responses to an automated interactive voice response system, or any other way known in the art to indicate parameters. After the user has entered sufficient parameters for an inquiry, the user can click the search button 410. The search button is for illustration purposes only and is not to be taken as a limitation. It can be interchanged with other labels, buttons, or other means to commit an inquiry or can be completely absent.

FIG. 5 illustrates a sample screen shot based on an inquiry for a Caribbean Beach Package deal. The web page 502 can contain a title 504, a short description of the overall parameters 506, an indication of the offered price for the as-yet-unidentified discount item 508, and/or an indication of savings over full retail price 510. The details of these fields can vary from package to package dynamically based on available discount and comparable items or based on the inquiry parameters. The exact text of these fields is intended to illustrate, not limit, possible implementations. The indication of savings, for example, can be shown as a percentage, a precise dollar amount, both, or neither. For example, the indication of savings in FIG. 5 can show "Save up to 36%" or "Save up to $489."

The system can present the list of items to the user in the comparable group using a table 512 or other comparison means. In this example, three packages are returned that satisfy the inquiry parameters. Details of each can be shown in place or can be accessible through a link.

When a user decides to purchase based on the presented information, she can click a buy now button 514 or provide another suitable indication. The small text on the button can be included on the button itself, elsewhere in the page, or can not be included at all. As discussed above, the eliminate button 516 offers the user a chance to select one or more of the items from the presented comparable group to eliminate. In this example, the option is offered for a price of $40, the difference between the lowest and the next lowest full retail prices, but the price can be determined otherwise. The price to eliminate one of the options can even be $0.

If a user decides to purchase but wants to reserve the right to back out of the purchase, the user can click the hedge button 518. In this example, the hedge button offers the user an option to cancel the transaction later for a flat rate of $50, for free, or for a percentage of any of the full retail prices or the discount price. This feature is an optional part of the web page and can be presented in ways other than a simple button. For example, the system can present a popup window just as the user starts to enter credit card information, or via any other presentation means known in the art.

FIG. 6 shows an example confirmation web page 602 of what a user might see after he or she has committed to purchase. A confirmation number or other confirmation means 604 is known in the art. The web page can indicate and/or reiterate the savings over full retail value to the customer 606. In a semi-opaque sales method, at this point or later, the purchased discount item can be identified by displaying the item information 608 as displayed in FIG. 5 as well as an additional detailed description 610 of the purchased discount item. Also, an itemized inventory of the purchase 612 can be provided so customers can print the web page as a confirmation or for financial records.

FIGS. 7-9 are similar to FIGS. 4-6, but illustrate how a user can interact with a semi-opaque sales system that sells televisions. FIG. 7 represents a non-limiting sample screen shot of how a user might inquire about a television. FIG. 7 illustrates a web browser but as has been discussed, the disclosure can be practiced in a number of ways, including but not limited to computer terminals, internet, telephones, interactive voice response systems, call centers, etc. The web page 702 can contain one or more ways to select one or more parameters 704, 706 for a group of items. In this example, the first parameters 704 are groups of radio buttons, each group of radio buttons indicating that each group allows for a single selection. The second parameters 706 are checkboxes indicating that any, all, or none of them can be selected. Other means of indicating parameters include a text search field that allows users to search across all items, touchtone or spoken responses to an automated interactive voice response system, or any other way known in the art to indicate parameters. After the user has entered sufficient parameters for an inquiry, the user can click the search button 708. The search button is for illustration purposes only and is not to be taken as a limitation.

FIG. 8 illustrates a sample screen shot of what might be returned to a user whose inquiry parameters indicated a 42" LCD 1080p HDTV. The web page 802 can contain a title 804, a short description of the overall parameters 806, an indication of the offered price for the as-yet-unidentified discount item 808, and/or an indication of savings over full retail price 810. The details of these fields can dynamically vary from package to package based on available discount and comparable items or based on the inquiry parameters. The exact text of these fields is intended to illustrate, not limit, possible implementations. The indication of savings, for example, can be shown as a percentage, a precise dollar amount, both, or neither. For example, the indication of savings in FIG. 8 can show "Save up to 44%" or "Save up to $930."

A table 812 or other comparison means can be used to present the list of items in the comparable group to the user in a webpage setting. In this example, three televisions are returned that satisfy the inquiry parameters. Details of each can be shown in place or can be accessible through a link.

When a user decides to purchase based on the presented information, she can click a buy now button 814 or provide another indication of a purchase. The small text on the button can be included on the button itself, elsewhere in the page, or can not be included at all. As discussed above, the eliminate button 816 offers the user a chance to select one or more of the items from the presented comparable group to eliminate. In this example, the option is offered for a price of $200, the difference between the lowest and the next lowest full retail prices, but the price can be determined otherwise. The price to eliminate one of the options can be $0.

If a user decides to purchase but wants to reserve the right to back out of the purchase, the user can click the hedge button 818. In this example, the hedge button offers the user an option to cancel the transaction later for free, for a flat rate, or for a percentage of any of the full retail prices or the discount price. This feature is an optional part of the web page and can be presented in ways other than a simple button. For example, the system can present as a popup window just as the user starts to enter credit card information, or via any other presentation means known in the art.

FIG. 9 shows an example confirmation web page 902 of what a user might see after he or she has committed to purchase. A confirmation number or other confirmation means 904 is known in the art. As this is a physical item instead of a service to be provided, the webpage can display a tracking number with the confirmation number. The web page can indicate and/or reiterate the savings over full retail value to the customer 906 in terms of either dollar amount saved or percentage saved. In a semi-opaque sales method, at this point or later, the purchased discount item can be identified by displaying the item information 908 as displayed in FIG. 8 as well as an additional detailed description 910 of the purchased discount item. Also, an itemized inventory of the purchase 912 can be provided so customers can print the web page as a confirmation or for financial records.

Another aspect of this disclosure relates to managing multiple credit cards for at least one user in the semi-opaque offering. In this aspect, at some point in the interaction with the user or users, assume that the user wants to book a hotel but for three rooms. In many instances, there can be a single person booking but there are multiple people who will be staying at the hotel and they can want to stay in rooms close to each other and further can want to pay separately. Therefore, in one example, a user requests multiple hotel rooms, or multiple contiguous hotel rooms, perhaps as part of the initial description of services desired. At some point within the interaction, perhaps after the user has committed to the purchase of one of the presented hotel options, the user can be presented with the opportunity to use a different credit card for each room. At which point a dialog or interactive window enables the user to enter separate information for each room. In some cases, one of the other people who will be staying in another room can not have given the booking user a credit card. In that instance, the system can book the rooms under the booking user's credit card but enable the booking user to provide an email address of another user such that an automated email can be sent out so that the second user can input the credit card information for the second user's room.

Following the entry of the necessary information for booking the rooms, the system can present confirmation information. Further, the notification of which hotel of the presented hotel options can be deferred until after all the credit card information is entered. For example, if the booking user has all of the multiple credit card information available, the interaction can delay notifying the user of which hotel they will stay at until after the acceptance of the offer and credit card information is received. Then the system can present the booking user with the hotel and confirmation information.

The system can receive a request from the user, after the acceptance of the semi-opaque offer, for a sub-item associated with the first bundle of items and can engage in a dialog with the user to enable payment for the sub-item. The system can engage in a dialog with the user to enable payment for each sub-item via a separate credit card. As has been noted above, a preferable point in the semi-opaque interaction with the user would be after the user accepts one of the group of presented options and before the system presents the user with notification of which item has been purchased. It can be during this preferable point in the interaction that the system receives the information regarding how the user or multiple users will pay for one or more of the sub-items via different credit cards.

Of course the above approach can also apply to products that can be purchased where a user can want to buy three widgets but pay for each with a separate credit card and so forth. Furthermore, payment types can be via credit card, debit card, PayPal™, or any other type of payment option now existing or developed in the future. For example, a user can purchase one sub-item by credit card, another sub-item via PayPal or debit card, and so forth.

Figure 10:
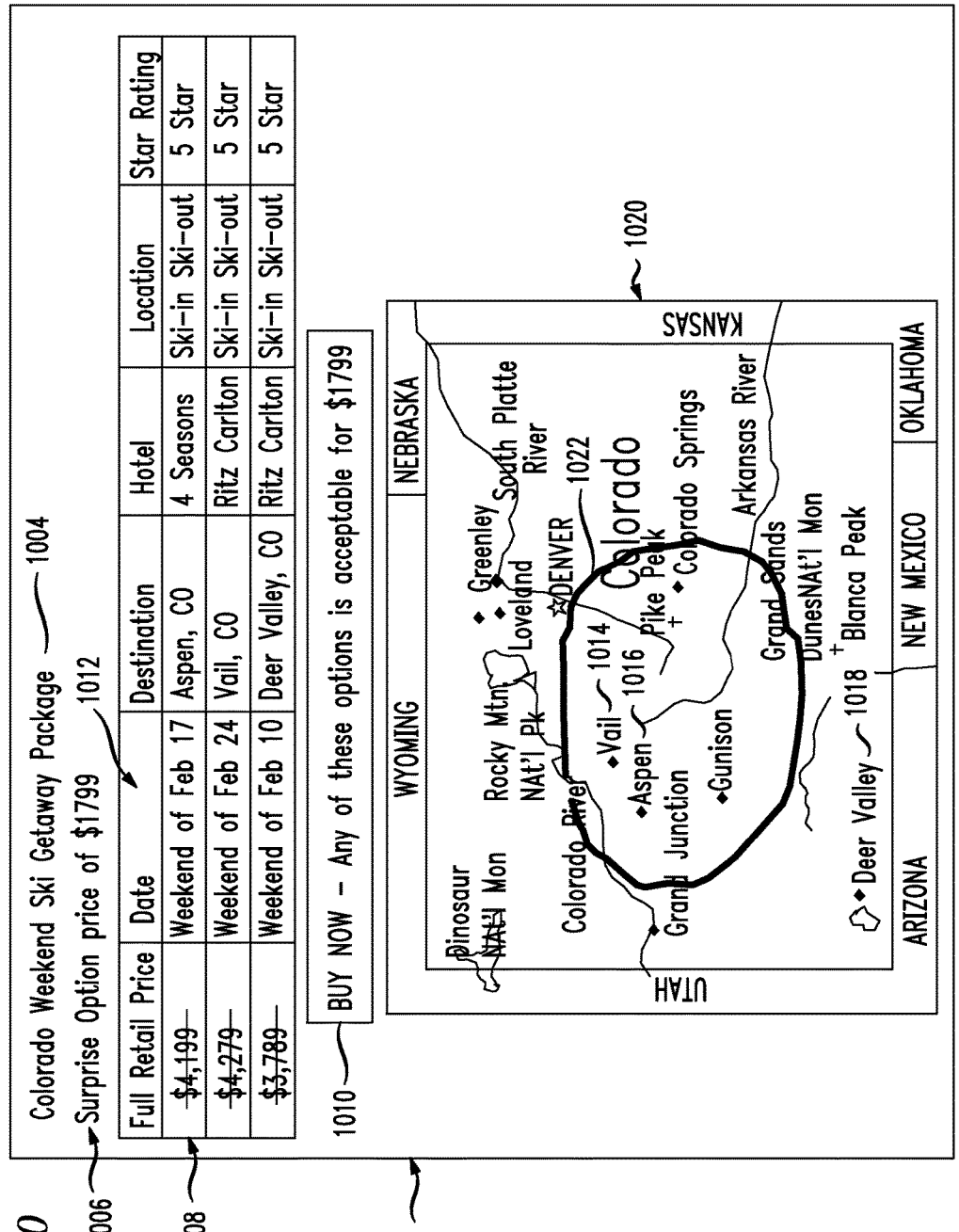
FIG. 10 illustrates an exemplary date agnostic semi-opaque travel site.

FIG. 10 illustrates an exemplary interface displaying a date agnostic implementation of a semi-opaque travel site. While FIG. 10 shows a web-page implementation of the date agnostic approach, other user interfaces are contemplated, including iPhone® or other mobile device interfaces. FIG. 10 shows a web page 1002 returned to a user searching for weekend ski packages in Colorado in February. The web page 1002 includes a title 1004, the offered price for the as-yet-unidentified discount item 1006, and can include any other relevant information. The details of these fields can vary from package to package dynamically based on available discount and comparable items or based on the inquiry parameters. The exact text of these fields is intended to illustrate, not limit, possible implementations. The web page includes a table 1008 or other comparison means of the list of items in the comparable group. The web server generating the page can retrieve the comparable items from an inventory database of destinations and dates that the various hotels are willing to sell at a discounted rate. In this example, the web page 1002 returns three ski packages in Aspen, Vail, and Deer Valley that satisfy the user's inquiry for a ski package on a February weekend. While FIG. 10 depicts each comparable item associated with a particular date, the display can be entirely date agnostic and show a range of dates instead of a specific date for each item. For example, instead of Weekend of February 17 for Aspen, Colo., the web page can display A Weekend surprise between February 3-24 for one or more of the comparable items, such that the user does not know which weekend she will get or if a particular weekend is even available. The web page 1002 can display details of each package on the same page, through links, or popups, for example.

When a user decides to purchase based on the presented information, she clicks a Buy Now button 1010 or provides other input indicating a purchase. FIG. 10 differs from FIG. 5 in that the web page 1002 includes a date column 1012. Therefore, the user can "buy now" if the destination and time are acceptable. In this manner, the semi-opaque approach is flexible over date, time, duration, location, destination, and/or brand.

Further, while the system generates a list of comparable items following some set of internal rules, the system can further accept input from the user to refine and define criteria for identifying comparable items. Often, a user deems a particular item attribute more important than others and wants to narrow down the comparable items based on that attribute. User input can be explicit, such as a user indicating a set of preferences by clicking buttons, or implicit, such as observing user trends and modifying the criteria based on those trends. In one aspect, the system can detect or extrapolate certain user-desired criteria based on a usage history or on a user profile.

For example in FIG. 10 the web page 1002 includes a map 1020 showing the location of Vail 1014, Aspen 1016, and Deer Valley 1018. If the user lives in Denver, for example, and doesn't want to drive more than a few hours away, the user can draw a circle 1022 on the map 1020 indicating that comparable items include only those items within the circle 1022. In this case, Deer Valley 1018 falls outside the circle 1022, so the system excludes Deer Valley from the list and optionally replaces it with one or more other comparable item. When the list of comparable items changes, the system can alter the semi-opaque "buy now" 1010 price accordingly.

Another variation of user input can be date-related. For example, the web page 1002 interface can include a calendar with a date slider spanning a period of time (several days, a week, a month, etc.). If the user is flexible over a period of time, the user can drag the slider on the calendar to indicate acceptable dates for the ski package. For instance, the user can indicate that comparable packages can occur during any weekend in February or any 3-day package between February 10th to February 20th. Such a web page can also employ other suitable input approaches. As user input adds or removes various comparable items, the web page can automatically update the price of the "Buy Now" button 1010 to reflect the current mix of comparable items. The other various configurations and details described above can apply equally to this embodiment.

In each embodiment described herein, the comparable items can be agnostic with respect to at least one variable, such as destination, brand, date, etc. In some cases, user preferences or user input determine the agnostic variable(s). In other cases, promotional or sales considerations determine the agnostic variable(s). In yet other cases, a user purchases the right to make a variable agnostic. For instance, a semi-opaque travel web page can offer comparable Hawaii vacations on the same weekend, and charge a $50 flex fee to make the date variable agnostic and consequently spread the comparable vacation packages over several months to find the best deal. On the other hand, a semi-opaque ticket sales web page can offer tickets to one of three different shows in the same week, and a user can purchase the right to change the item variable (i.e. select a specific Broadway show he or she wants to see, instead of a surprise). When semi-opaque sales approaches allow users the flexibility of making certain variables agnostic or not, users feel more in control of the situation and can be more comfortable with the overall process, leading to a higher rate of sales.

In one aspect, the semi-opaque sales system allows users to indicate specific items which they feel are comparable to the other listed items. The system can use this feedback to refine the comparable item selections for later requests from the same customer or for requests from other customers. However, if the user attempts to "game" the system by grouping dissimilar comparable items (such as grouping Motel 6 with Hilton and Hyatt), the system can prevent combinations of such extremely dissimilar comparable items.

Figure 11:
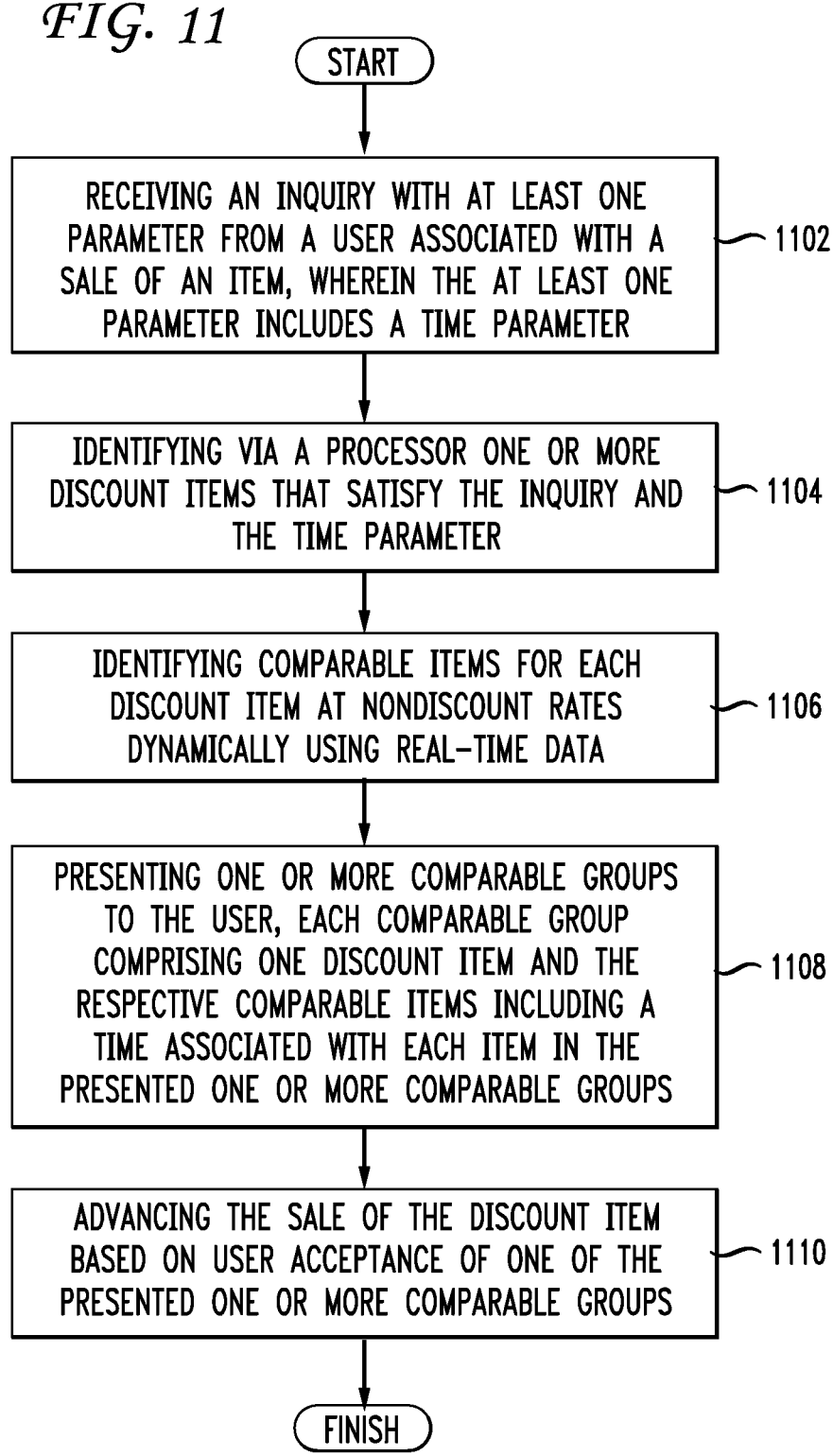
FIG. 11 illustrates a third sample semi-opaque sales method.

FIG. 11 illustrates a third sample semi-opaque sales method. A system 100 as shown in FIG. 1 can perform this method. The system 100 first receives an inquiry with at least one parameter from a user associated with a sale of an item, wherein the at least one parameter includes a date parameter (1102). The inquiry can be completely date and/or time agnostic. The inquiry can also be agnostic with regard to other parameters, such as place, an item-specific category, or price. For instance, the system can provide entirely date agnostic results (i.e. the price is known up front, but not the date of a hotel stay) or partially date agnostic (i.e. any date is acceptable within a 6 month window or within a 3 week window). The system identifies via a processor one or more discount items that satisfy the inquiry and the date parameter (1104) and identifies comparable items for each discount item at nondiscount rates dynamically using real-time data (1106). The system presents one or more comparable groups to the user, each comparable group including one discount item and the respective comparable items including a time associated with each item in the presented one or more comparable groups (1108), such as on a web page or through a software client. The system advances the sale of the discount item based on user acceptance of one of the presented one or more comparable groups (1110).

Figure 12:
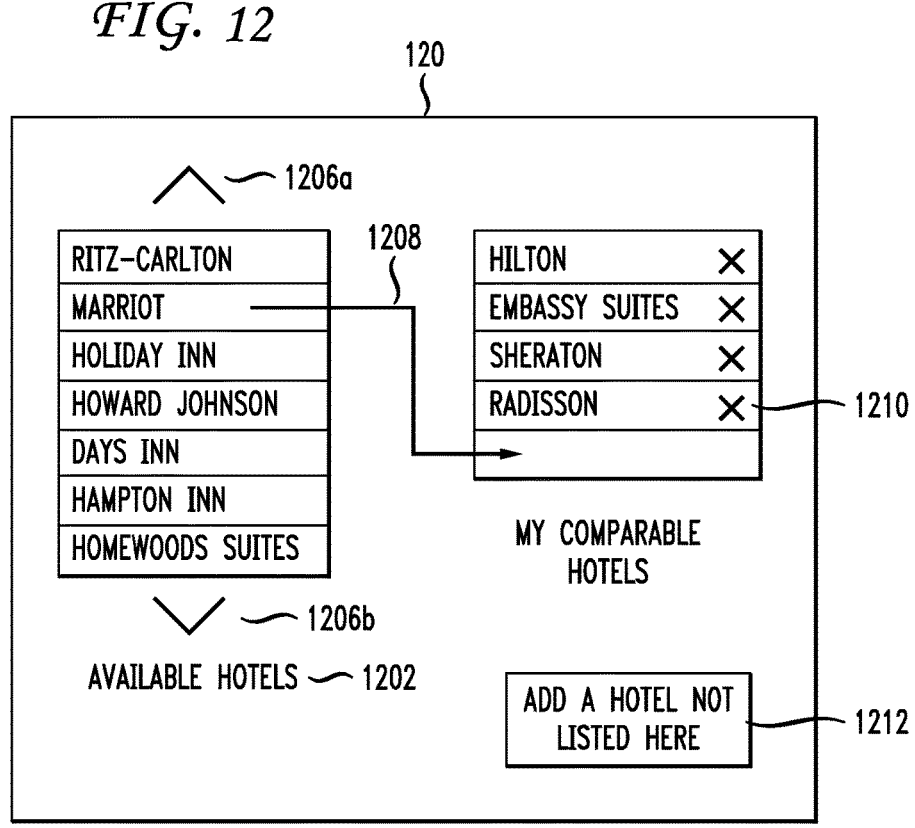
FIG. 12 illustrates an exemplary user interface for a user to generate a personalized comparable items list.

FIG. 12 illustrates an exemplary user interface 1200 for a user to generate a personalized comparable items list. The user interface can be via text to speech, touchtone phone, a web page, a software application, or even a call center. For illustrative purposes, the interface 1200 shown here is a web page. The interface 1200 includes a list of available hotels 1202 and a list of personalized comparable hotels, titled "My Comparable Hotels" 1204. The user can drag one or more items from the list of available hotels 1202 to the personalized list 1204 with a click and drag motion 1208 or other suitable user input. The system can determine other comparable hotels based on the list of personalized comparable hotels. Either list 1202, 1204 can include controls 1206*a*, 1206*b* to navigate to currently undisplayed items. The system can prepopulate the list of personalized comparable hotels 1204 based on a user history and/or a user profile or based on paid placement. The user can delete items from the personalized list 1204, such as clicking on an X 1210, dragging an item out of the list, or speech or other input. The system can offer this interface at the beginning of each transaction, at an initial personal profile creation stage unassociated with any particular semi-opaque transaction, upon user request, or at any other time. While FIG. 12 illustrates hotels, the same principles can be applied to nearly any other good or service.

By this mechanism, the system allows users more control over the semi-opaque process from the beginning stages (i.e. seeding the process with a personalized list of personalized items) to the final stages (i.e. narrowing down the presented list of comparable items). The options, variations, and various combinations discussed herein can be offered as different service tiers.

Figure 13:
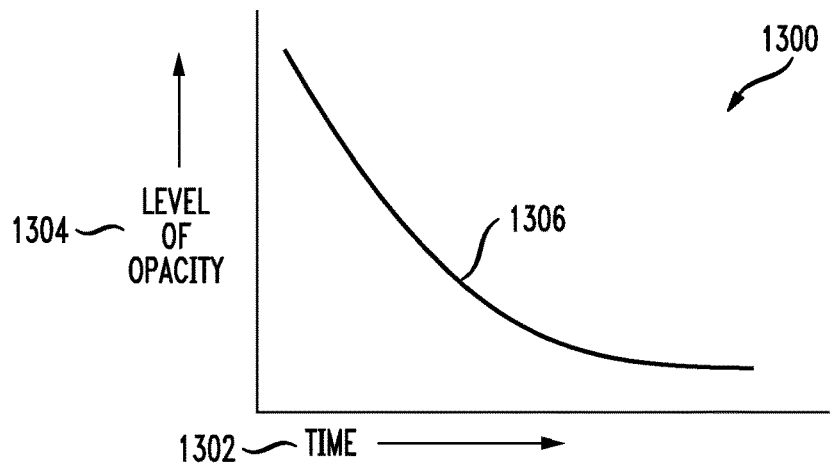
FIG. 13 illustrates an example scale of opacity over time.

In one variation, the system can incorporate a sales opacity scale. FIG. 13 illustrates an example chart 1300 of the level of opacity 1304 over time 1302 or based on some other variable. In the example of time 1302, as the chart 1300 shows, the level of opacity of an offer 1306 can decrease as time progresses. An example high opacity level offer in a category of "a 3-5 day ski vacation in the Rocky Mountains" can include a first offer of "a 5 day ski vacation in Vail", a second offer of "a 4 day ski vacation in Jackson Hole", a third offer of "a 5 day ski vacation in Aspen", and a fourth offer of "a 3 day ski vacation in Park City". An example of a medium opacity level offer may remove the fourth offer, for a resulting category of "a 4-5 day ski vacation in the Rocky Mountains". An example of a low opacity level offer may go on to remove the second offer for a resulting category of "a 5 day ski vacation in Colorado". As the level of opacity increases, the offers for the discount item and the comparable items can include fewer details, fewer items, and/or less specific details. As the level of opacity decreases, the offers for the discount item and the comparable items can include more details, more items, and/or more specific details.

The sliding scale of opacity can be based on information outside of direct user interactions with a semi-opaque offer. For example, the system can determine an individual scale of opacity for offers presented to different users based on a time, available inventory, a user location, a desired profit margin, a user profile, demographic information, and/or other information. In other words, the sliding scale of opacity is driven by one or more inputs other than input that a user enters or provides in direct response or reaction to the semi-opaque offer. The user can enter or authorize the release of this information prior to the offer, such as entering preferences in a user profile or allowing a smartphone application to access location data, but these occur prior to the semi-opaque offer and the user does not provide this information in response to or because of the semi-opaque offer. Thus, the scale of opacity for the semi-opaque offer is based on information besides what a user provides through interactions related to the offer itself.

Thus, the sales opacity scale is a way to make a semi-opaque sales offer progressively less opaque. Making a semi-opaque sales offer less opaque can also include revealing additional details regarding the offered items, reducing the quantity of comparable items offered, and/or any other change that reduces the actual or apparent opacity of the sales offer. While this chart and many of the examples provided below are discussed in terms of time, the level of opacity can change based on many other factors. For instance, the sales opacity scale can be time-sensitive, inventory sensitive, location sensitive, based on competitor advertisements, and/or based on any number of factors associated with the semi-opaque sales offer. Further, while the chart 1300 and other examples discussed below show the level of opacity decreasing, the approach can be used to either increase or decrease the level of opacity, such as based on desired target sales or available inventory.

Figure 14:
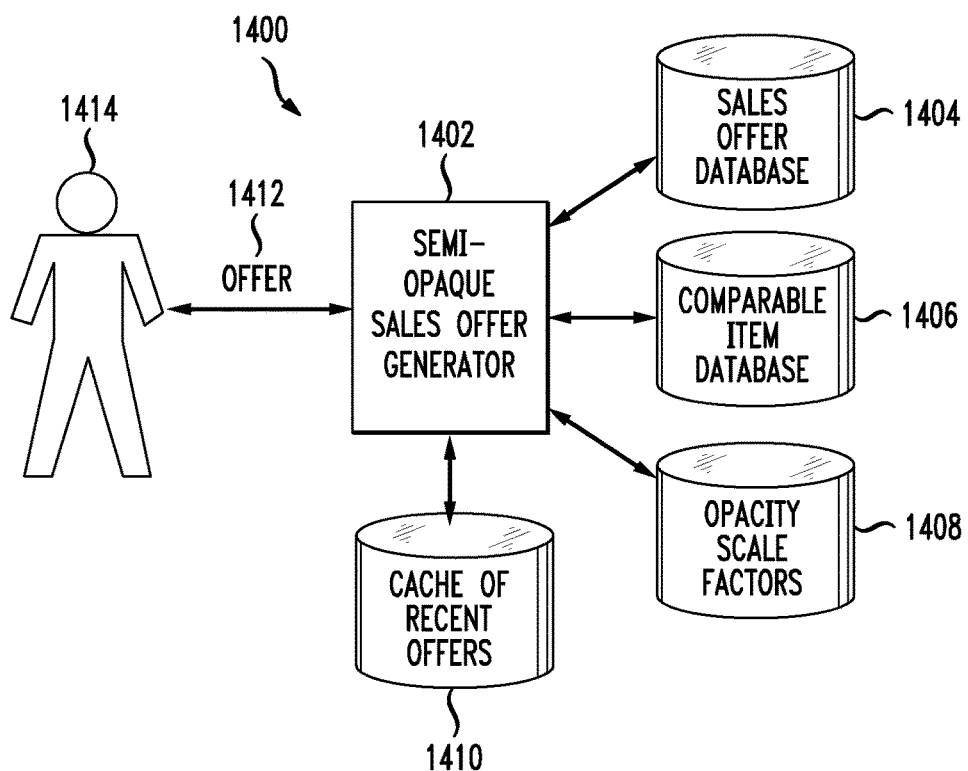
FIG. 14 illustrates an example system configuration for generating offers having varying levels of opacity.

FIG. 14 illustrates an example system configuration 1400 for generating offers having varying levels of opacity. In this configuration, a semi-opaque sales offer generator 1402 determines to send a semi-opaque offer 1412 to a user 1414. The semi-opaque sales offer generator 1402 can make this determination based on a user request or any other trigger, for example. The semi-opaque sales offer generator 1402 retrieves information from a sales offer database 1404, a comparable item database 1406, and set of opacity scale factors 1408. The factors can include one or more of time, location, inventory, user profile information, and so forth. Using this information, the system selects a sales offer and comparable items for creating the semi-opaque offer 1412, and determines a level of opacity for the semi-opaque offer 1412 based on one or more of the opacity scale factors 1408, such as time or available inventory. When creating an offer 1412, the semi-opaque sales offer generator 1402 can store all or part of the offer 1412 in a cache of recent offers 1410. In this way, the semi-opaque sales offer generator 1402 can revise, edit, resend, or chart opacity progress of recently provided offers. In another variation, a user can store, download, or retrieve information from the cache of recent offers to perform analytics to determine which levels of opacity are the most successful, which pieces of information users are most interested in seeing before accepting a semi-opaque offer, and so forth. Further, the semi-opaque sales offer generator 1402 can modify recent offers from the cache of recent offers 1410 based on information from the opacity scale factors 1408 instead of compiling an entirely new offer. In one aspect, the cache of recent offers 1410 is stored on a server, but the cache 1410 can also be stored entirely or partially in local storage of a mobile device, for example. In this way, the server can provide the information to an application on a mobile device, for example, and the application can then make decisions regarding how to increase or decrease the opacity of the semi-opaque sales offer based on available opacity scale factors 1408.

The disclosure now turns to several examples to further illustrate the sliding scale of opacity. In an example of a time-sensitive sales opacity scale, the user searches in January for four-star to five-star hotels in Boston for the last weekend in April. The system can provide a very opaque sales offer to the user because a great amount of time, such as "an undisclosed four-star or five-star hotel in downtown Boston for $199 per night". However, if the user does not accept the sales offer and makes the same (or a similar) search in February, the system can provide a less opaque sales offer, such as "One of the Boston Harbor Hotel, the Four Seasons Hotel Boston, The Liberty Hotel Boston for $249 per night", because the time of the search is much closer to the requested hotel stay. If the user rejects that sales offer and makes the same search yet again in the first week of April, the system can provide an even less opaque sales offer, such as "One of the Four Seasons Hotel Boston and the Boston Harbor Hotel for $329 per night", because the time of the search is only two weeks before the requested hotel stay. Note that the system can optionally increase the offer price as the level of opacity decreases and the user is more certain of which option he or she will receive. While this example illustrates several months and multiple searches, the same principles can be applied to a single search with a timer that slowly reveals additional information (i.e. makes the offer less and less opaque) for a single search as time progresses. This approach can also be used to lure back potential customers who have searched and turned down an offer in the past. Based on information describing the potential customer, the system can determine which pieces of information can be added to the offer (making the offer less opaque) to make the offer more attractive to the potential customer.

In an example of an inventory-sensitive sales opacity scale, a first user searches for a 60" 3D-capable flat panel television. The primary seller of such televisions has many current models still in stock while a new model is slated to arrive in a few weeks. The primary seller wishes to quickly clear out the current models to make room in the inventory for the new model and can instruct the semi-opaque sales system to offer a sliding discount price based on the available remaining inventory. For example, if the primary seller has 5,000 televisions in stock, the seller can establish that semi-opaque offers to sell the first 2,000 are at a 40% discount off full retail price, the next 1,000 are at a 30% discount, the next 1,000 are at a 20% discount, and the remaining at a 15% discount. Thus, the seller can control the rate of sales and protect profit margins to some extent based on available inventory and/or capacity.

The system can incorporate multiple variables when calculating the sales opacity scale, such as location. For instance, consider a bakery has miscalculated and overbaked or had a catered event cancel at the last minute. Rather than discarding unsold easily perishable baked goods, the bakery can connect with a semi-opaque sales service to send offers (without an initial user request) to individuals that are near the bakery until the excess baked goods are all sold. For example, if the bakery has excess cinnamon rolls, cookies, and carrot cake, the system make semi-opaque offers for any of them to nearby potential customers via text message, automated phone calls, email, etc. If the cinnamon rolls are the most perishable, the system can attempt to use semi-opaque offers to sell the cinnamon rolls first at a significant discount to customers that are the nearest. If the carrot cake is the next most perishable, as the cinnamon rolls begin to sell out, the system can transition to promoting the carrot cake at less of a discount to customers that are in a somewhat larger region. Finally, the cookies may have a shelf-life of a week, so the bakery can offer a modest discount on the cookies to a much wider group of potential customers. In this way, the scale can reflect many different aspects and be more responsive and personalized.

The disclosure now turns to an exemplary method for conducting sales with different levels of opacity in semi-opaque sales, as illustrated in FIG. 15. A system configured to practice the method includes a processor and a graphical user interface 170/190 configured on a device 202 through which the system, over the Internet, receives an inquiry with at least one parameter from a user associated with a sale of an item (1502) and identifies one or more discount items that satisfy the inquiry (1504). Then the system filters the one or more discount items based on a sales opacity scale to yield filtered discount items (1506). The sales opacity scale can be determined independently of input from the user. For example, the sales opacity scale can be based on available inventory, a countdown timer, a sales target, a user profile describing characteristics of the user, etc. In this scenario, factors outside of the user's direct control and/or information obtained from sources other than the user's input can influence the sales opacity scale, how much information to reveal and/or which pieces of information to reveal as part of the offer, for example. On the other hand, the sales opacity scale can be determined based on input from the user. In this scenario, a user can select a desired discount amount (5%, 10%, or 20%) in exchange for a corresponding level of opacity in the offer. The sales opacity scale can be based on input from other users besides the one to whom the offer is extended. For example, if similar users (based on similarities in location, personal preference, profile, and so forth) are eagerly making purchases at a particular combination of price and opacity level, then the system can adjust the price and opacity level of the offer made to the user to increase the sales rate, decrease the sales rate, increase profits, and/or to achieve other business goals. Thus, different users can receive semi-opaque sales offers for a same discount item at different levels of opacity.

The system identifies comparable items for each discount item at nondiscount rates dynamically using real-time data (1508). Then the system presents one or more comparable groups to the user, each comparable group including one filtered discount item and respective comparable items (1510), and advances the sale of the discount item based on user acceptance of one of the presented one or more comparable groups (1512). The sales opacity scale can be time sensitive and can be configured to reveal additional details regarding the filtered discount items as time progresses. For example, the additional details can be revealed to the user at a predetermined time after receiving acceptance of the semi-opaque offer. The system can optionally present details describing at least one item in the one or more comparable groups according to the time-sensitive sales opacity scale. At least one of the first bundle of items or the second bundle of items can be identified from subsets of matching items generated by identifying, from an array of all available bundles of items, comparable bundles of items based on the purchase inquiry and creating subsets of comparable bundles.

Bonuses can provide greater incentive for users than discounts. Users feel like they have 'won' something when they get a benefit or perk. In order to leverage this aspect of human psychology, the system, via the graphical user interface on the device 202, can offer bundles of items in a semi-opaque manner. For example, instead of a semi-opaque offer of two hotel rooms at a discount price, the system, via the graphical user interface on device 202, can present a semi-opaque offer of two bundles of hotel rooms plus additional services at a discount price that is the full price of just the hotel rooms without the additional services. In this way, the effect is the same in that the user can purchase an undisclosed one of the items in the semi-opaque offer at a lower price. In this way, the user pays a discounted price as compared to the full price of purchasing the bundle of items outside of the semi-opaque offer.

In the case of base item of hotel lodging, the bonus items can include one or more ancillary or extra services, such as credit at a hotel spa, ski passes, 18 holes of golf at a golf course near to the hotel, a room upgrade, resort credit, casino credit, late checkout, food and beverage credit, discounts or credits for room service, internet access, or other concierge services. Bundles are not only limited to hotel lodging, and can include many other types of items and services. For example, a semi-opaque bundle can include a base item of a television and a bonus item as a year of cable television service, where the discount price is the full price of the television. Another example semi-opaque bundle can include a base item of a laptop computer with multiple bonus items of a RAM upgrade, a carrying bag, and an antivirus subscription. Yet another example semi-opaque bundle can include a base item of a custom-fitted suit with a bonus item of shoes and a tie. Each of these bundles can be offered with comparable bundles in a semi-opaque manner.

In the case of hotels, a hotel chain can experiment with offering different types of bonus items, offering different types of bonus items with different room categories or hotel types, and so forth. The hotel chain can even provide instructions to the system to base the selection of the bonus item on other factors, such as what competing hotels are offering in the semi-opaque offer, what the user to whom the offer is presented has selected in the past, which bonus item has the highest profit margin or the lowest cost, for example. Then, the system can track user behavior in or after the semi-opaque process or solicit user feedback via a survey or perform sentiment analysis to determine how satisfied or pleased users are with various types of bonus items. Then, using this feedback, the system can provide suggestions to hotel chains as to which types of bonus items are successful overall, which types of bonus items are successful for particular user demographics, or even for a specific individual user. Such analytics data can allow hotels or the system to suggest bundles that are likely to succeed in a semi-opaque offer.

When populating a semi-opaque offer, the system can perform an additional analysis in order to create 'dummy' bundles, or bundles which are presented in the semi-opaque offer but which are not actually available. The system can select a base item, and determine which bonus items are actually available. The system cannot simply add a bonus item on a bundle in the semi-opaque offer, if that bonus item is not actually available for a given base item. For example, the system cannot offer resort credit with a hotel room that has no associated resort. If the system did offer a bonus item that was not actually available, the user may be able to identify which bundle in the semi-opaque offer is the discount bundle available for purchase via the semi-opaque offer. Therefore, the system can perform some additional analysis to determine, for a given base item, which bonus items are available, their approximate or actual costs, and so forth.

A system implementing an example method embodiment for offering bundles in a semi-opaque fashion can identify a first bundle of items having a first base item and a first bonus item, and a second bundle of items having a second base item and a second bonus item, wherein the first bundle of items and the second bundle of items are associated with a purchase inquiry from a user. The system can select the first bundle of items and the second bundle of items from a set of available bundles of items based on input from the user. The system can present to the user a semi-opaque offer having the first bundle of items, the second bundle of items, and a discount price, wherein the semi-opaque offer does not identify which of the first bundle of items and the second bundle of items will be sold at the discount price to the user upon acceptance of the semi-opaque offer, and wherein the discount price is a full price of the first base item. The discount price can be the full price of the first base item, or can be within a threshold above or below the first base item. The system can adjust the discount price up or down based on multiple factors. For example, the system can adjust the discount price up if the bonus item is costly, or the system can adjust the discount price down if the bonus item is inexpensive to provide, or if the hotel in the bundle has a strong desire to attract this particular customer or this type of customer. Thus, the discount price can be exactly the full price of the base item, or can be tied to the full price of the base item. The method can include receiving purchase inquiry parameters from the user and selecting the first bundle of items and the second bundle of items based on the purchase inquiry parameters. The method can also include receiving from the user a selection of one of the first bundle of items or the second bundle of items and quoting a nondiscount price for the selection.

Then, after receiving acceptance of the semi-opaque offer from the user via the graphical user interface of the device 202, the system can disclose that the user has purchased the first bundle of items at the discount price. After the user accepts the semi-opaque offer, the system can send a receipt or confirmation to the user. The system can send a single confirmation including both the base item and the bonus item or items, or can send separate confirmations. Whether the confirmations are combined can depend on whether a single entity will provide the base and bonus items.

Destination management organizations (DMOs) are organizations that promote travel and tourism for a particular destination, such as a city, state, or county. Often, DMOs engage in advertising to attract travelers by promoting popular events, attractions, venues, restaurants, hotels, and so forth. Travelers spend money at the destination and provide employment as well as tax revenue for the destination. DMOs often struggle with tracking success and how to directly attribute increases in travel or tourism to the DMO's efforts. Thus, a DMO can provide additional incentives to further reduce the cost of the semi-opaque offering, to reduce the cost of a bonus item, to upgrade a type of the bonus item, to include an additional bonus item, and so forth. For example, the DMO can provide a budget for a specific semi-opaque offer. The system can then analyze a user profile of a potential traveler considering the semi-opaque offer, and dynamically determine how to use the budget to make the semi-opaque offer more appealing for the potential traveler. For example, if the system knows that the potential traveler is going on a honeymoon, the system can use the DMO budget to offer a reduced-cost upgrade to a honeymoon suite, whereas if the system knows the potential traveler is travelling with young children the system can use the DMO budget to offer a bonus of free tickets to a waterpark near to the destination. Then, if the user accepts the semi-opaque offer, the DMO contributes the budgeted funds, and if the potential traveler does not accept the semi-opaque offer, the DMO does not contribute the budgeted funds because the potential traveler did not accept the offer and make a purchase.

In one embodiment, the DMO can provide target profiles to the system, each target profile describing desirable traveler characteristics, and setting a separate budget for travelers falling under the target profile. Thus, the DMO can instruct the system how to allocate incentives from a marketing fund. In this way, the DMO can provide smaller or no incentives for semi-opaque offers the system presents to users that are not strongly targeted by the DMO, and can provide larger incentives for users that the DMO desires to attract. For example, the DMO may offer larger discounts to attract travelers who are planning a 5-day or longer vacation, or travelers with incomes above a certain threshold.

The system can then track statistics at least a portion of the spending associated with travelers who accept the semi-opaque offers, and can generate reports based on those statistics for the DMOs. In this way, DMOs are able to see the return on the money invested as incentives via the semi-opaque offers. In this approach, DMOs are paying funds for discounts for travelers that are basically guaranteed to make the travel because they have already committed to the semi-opaque offer for the travel and/or hotel.

In the case of travel, multiple different DMOs can offer different incentives for the same region, which can be layered on top of each other. For example, a semi-opaque offer for a vacation in Napa Valley may include layers of incentives contributed by a Napa Valley Winegrowers' Association, Napa County, San Francisco Area Tourism Authority, and the state of California. The different DMOs can offer different types of incentives so that the base item includes a set of different additional incentives, or the different DMOs can offer money to reduce the cost. For example, a hotel may offer a $250 per night room at a semi-opaque discount of $190 per night. Then one DMO contributes funds for an additional $15 per night discount, a second DMO contributes funds for an additional $5 per night discount, while a third DMO offers a free round of golf. Then, while the hotel alone would have only provided a $190 per night discount rate via the semi-opaque offer, the hotel plus the contributions from the DMOs can provide a $170 per night discount rate via the semi-opaque offer plus golf. The additional incentives can attract many travelers which may otherwise have been priced out of the market, or who may have been undecided regarding travel plans.

This approach allows DMOs to drive incremental customers and to track their true return on investment (ROI) for new travelers. The system allows DMOs to know if the traveler would have come either way. This approach benefits travelers because of increased competition between DMOs for travelers. The system can assist DMOs in calculating the life time value of a new traveler to a destination. DMO success is amplified when travelers want to return once they experience the destination. The system can further enhance or target DMO sponsored offers based on recent travel. For example, the system can pull entry visa traveler names to identify travelers that have not recently been to a particular destination or that have never been to that destination. The DMO can choose to offer larger discounts or bonuses to incentivize these types of travelers in order to maximize advertising and promotional funds to expose new travelers to that destination.

While these approaches with DMOs are discussed in terms of travel and lodging via semi-opaque offers, the same principles can also apply to other goods and services via different types of organizations. For example, an electronics brand may choose to spend a portion of its marketing budget to incentivize sales of its electronics devices via semi-opaque offers. An electronics retailer may spend a portion of its marketing budget in a similar fashion.

In another embodiment, the system can offer a semi-opaque waitlist option which may have a time limit. For example, many times a hotel may not be ready to offer discounts at the present time, while the user indicates at least some level of flexibility in their timing for travel plans. As such, the system can establish a conversation between the hotel and the traveler, in which the hotel publishes a discount price or a package of incentives, perks, and/or upgrades that may be made available in the future based on supply and demand. Simultaneously, the traveler can publish a length of time that he or she is willing to wait for the hotel to accept or deny the offer. As such, the hotel can view offers over a longer period of time and the traveler can post offers that extend past an instance in time. The system can facilitate the conversation, negotiation, or waiting period until one hotel accepts or until the indicated time runs out.

As such, the semi-opaque system can show the user a semi-opaque list (or allow the user to create their own list), then the system can communicate with the merchants or analyze parameters previously established by the merchants in order to propose a wait list time-limit. That time-limit can allow the merchants (such as hotels) who are on the list to decide whether to accept that wait list option at some point before the expiration of the time-limit. When one hotel accepts the offer (or the system automatically accepts on behalf of the hotel), the system can remove or deactivate the offer so that no other hotel can accept the offer, which would result in a situation where the user has two hotel commitments. The hotel may or may not be able to view the other hotels in the list, or offers from the other hotels. For example, the traveler can select the Hyatt, Hilton, and Marriott in Miami for either one discounted price for all hotels or a separate discounted price for each hotel. Alternatively, the user can select one offer or multiple offers of incentives/bonuses. The traveler can prescribe their own wait list time-limit of X days or can set the wait list time-limit to expire on an indicated date. The option for the hotel to accept remains active until that expiration date. If the hotel accepts, the system removes the option so no other hotel can accept. The hotel can compare with their own reservation system to see if that traveler is already booked.

The system can get "wait list" rates from a database, and then have a quick book option for the hotel on an administrator screen. That quick book option can close the wait list and automatically push the reservation into the hotel reservation system, thereby eliminating or reducing manual date entry.

Embodiments within the scope of the present disclosure can also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hardwired links, wireless links, or by a combination thereof) through a communications network. In a distributed computing environment, program modules can be in both local and remote memory storage devices.

Although the above description can contain specific details, they should not be construed as limiting the claims in any way. Other configurations of the described embodiments are part of the scope of this disclosure. For example, this semi-opaque method of conducting sales can apply to any time or date sensitive good or service, such as airline travel, opera tickets, hotel reservations, and so on. Accordingly, the appended claims and their legal equivalents should define the recited embodiments, rather than any specific examples given.

I claim:

1. A method comprising:
identifying, by a processor, a first base item and a first bonus item, and a second base item and a second bonus item, wherein the first base item and the second base item are associated with a purchase inquiry received over the Internet from a user via a user interface of a computer-based application on a user device, wherein the second base item is selected from a set of comparable items based on an attribute of the first base item and wherein the second base item is not actually available for sale;
determining, via the processor, a discount price based on one or more of a base item price of the first base item and a bonus item price of the first bonus item;
transmitting, via the processor, over the Internet and to the user device, a semi-opaque offer for display on the user interface of the user device, the semi-opaque offer comprising the first base item and the first bonus item, the second base item and the second bonus item, and the discount price, wherein the semi-opaque offer does not identify which of the first base item and the second base item will be sold at the discount price to the user upon acceptance of the semi-opaque offer;
receiving, via the processor and over the Internet, acceptance of the semi-opaque offer from the user device and through the computer-based application; and
after receiving acceptance of the semi-opaque offer disclosing that the user has purchased the first base item and the first bonus item at the discount price.

2. The method of claim 1, further comprising:
receiving purchase inquiry parameters from the user; and
selecting the first base item and the first bonus item and the second base item and the second bonus item based on the purchase inquiry parameters.

3. The method of claim 1, wherein presenting the semi-opaque offer further comprises presenting additional details describing at least one of the first base item and the first bonus item or the second base item and the second bonus item.

4. The method of claim 1, wherein the first base item comprises lodging at a first hotel, the first bonus item comprises a first service available at the first hotel, the second base item comprises lodging at a second hotel, and the second bonus item comprises a second service available at the second hotel.

5. The method of claim 1, further comprising:
receiving from the user a selection of one of the first base item and the first bonus item or the second base item and the second bonus item; and
quoting a nondiscount price for the selection.

6. The method of claim 5, wherein the nondiscount price comprises a full price for a selected one of the first base item and the first bonus item, or the second base item and the second bonus item.

7. The method of claim 1, wherein additional details associated with purchasing the first base item and the first bonus item are not revealed to the user until after receiving acceptance of the semi-opaque offer.

8. The method of claim 7, wherein the additional details are revealed to the user at a predetermined time after receiving acceptance of the semi-opaque offer.

9. The method of claim 1, further comprising:
selecting the first base item and the first bonus item and the second base item and the second bonus item from a set of available items based on input from the user.

10. The method of claim 1, wherein the semi-opaque offer includes additional items which are not available at the discount price.

11. The method of claim 1, further comprising:
before receiving the acceptance of the semi-opaque offer, providing an option to the user to cancel, after receiving acceptance of the semi-opaque offer, a purchase in exchange for a fee.

12. The method of claim 1, wherein at least one of the first base item and the first bonus item or the second base item and the second bonus item is identified from subsets of matching items generated by:
identifying, from an array of all available items, comparable items based on the purchase inquiry; and
creating subsets of comparable items, each subset based on at least one parameter of the purchase inquiry.

13. The method of claim 12, further comprising:
filtering subsets of comparable items using a filter parameter.

14. The method of claim 13, further comprising:
expanding the filter parameter when insufficient comparable items are returned after the subsets of comparable items are filtered.

15. The method of claim 12, wherein a subset is sorted based on an attribute value associated with contents of the subset.

16. The method of claim 1, further comprising:
receiving a request from the user, after the acceptance of the semi-opaque offer, for a sub-item associated with the first base item and the first bonus item; and engaging in a dialog with the user to enable payment for the sub-item.

17. The method of claim 1, wherein a destination management organization contributes to the discount price.

18. A system comprising:
a processor; and
a non-transitory computer-readable storage medium storing instructions which, when executed by the processor, cause the processor to perform operations comprising:
identifying a first base item and a first bonus item, and a second base item and a second bonus item, wherein the first base item and the second base item are associated with a purchase inquiry received over the Internet from a user via a user interface of a computer-based application on a user device, wherein the second base item is selected from a set of comparable items based on an attribute of the first base item and wherein the second base item is not actually available for sale;
determining a discount price based on one or more of a base item price of the first base item and a bonus item price of the first bonus item;
transmitting, over the Internet and to the user device, a semi-opaque offer for display on the user interface of the user device, the semi-opaque offer comprising the first base item and the first bonus item, the second base item and the second bonus item, and the discount price, wherein the semi-opaque offer does not identify which of the first base item and the second base item will be sold at the discount price to the user upon acceptance of the semi-opaque offer;
receiving, via the processor and over the Internet, acceptance of the semi-opaque offer from the user device and through the computer-based application; and
after receiving acceptance of the semi-opaque offer disclosing that the user has purchased the first base item and the first bonus item at the discount price.

19. A non-transitory computer-readable storage device having stored therein instructions which, when executed by a processor, cause the processor to perform operations comprising:
identifying a first base item and a first bonus item, and a second base item and a second bonus item, wherein the first base item and the second base item are associated with a purchase inquiry received over the Internet from a user via a user interface of a computer-based application on a user device, wherein the second base item is selected from a set of comparable items based on an attribute of the first base item and wherein the second base item is not actually available for sale;
determining a discount price based on one or more of a base item price of the first base item and a bonus item price of the first bonus item;
transmitting, over the Internet and to the user device, a semi-opaque offer for display on the user interface of the user device the semi-opaque offer comprising the first base item and the first bonus item, the second base item and the second bonus item, and the discount price, wherein the semi-opaque offer does not identify which of the first base item and the second base item will be sold at the discount price to the user upon acceptance of the semi-opaque offer;
receiving, via the processor and over the Internet, acceptance of the semi-opaque offer from the user device and through the computer-based application; and
after receiving acceptance of the semi-opaque offer disclosing that the user has purchased the first base item and the first bonus item at the discount price.

* * * * *